United States Patent
Moriyama et al.

(10) Patent No.: US 11,907,053 B2
(45) Date of Patent: Feb. 20, 2024

(54) FAILURE HANDLING APPARATUS AND SYSTEM, RULE LIST GENERATION METHOD, AND NON-TRANSITORY COMPUTER-READABLE MEDIUM

(71) Applicant: NEC Corporation, Tokyo (JP)

(72) Inventors: Nagi Moriyama, Tokyo (JP); Yuko Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/799,988

(22) PCT Filed: Feb. 25, 2021

(86) PCT No.: PCT/JP2021/007116
§ 371 (c)(1),
(2) Date: Aug. 16, 2022

(87) PCT Pub. No.: WO2021/172435
PCT Pub. Date: Sep. 2, 2021

(65) Prior Publication Data
US 2023/0070080 A1    Mar. 9, 2023

(30) Foreign Application Priority Data
Feb. 28, 2020   (JP) ................. 2020-032721

(51) Int. Cl.
*G06F 11/07*   (2006.01)
(52) U.S. Cl.
CPC ...... *G06F 11/0772* (2013.01); *G06F 11/0775* (2013.01); *G06F 11/0793* (2013.01)
(58) Field of Classification Search
CPC ............. G06F 11/0772; G06F 11/0775; G06F 11/0793; G06F 11/0709; G06F 11/0766; G06F 11/0751; G06F 8/30
See application file for complete search history.

(56) References Cited

U.S. PATENT DOCUMENTS

| 10,839,352 B1* | 11/2020 | Mitchell ............. G06F 16/2365 |
| 2003/0070114 A1 | 4/2003 | Yasuda |

(Continued)

FOREIGN PATENT DOCUMENTS

| JP | 2003-114811 A | 4/2003 |
| JP | 2005-038223 A | 2/2005 |

(Continued)

OTHER PUBLICATIONS

International Search Report for PCT Application No. PCT/JP2021/007116, dated May 11, 2021.

(Continued)

*Primary Examiner* — Matthew M Kim
*Assistant Examiner* — Matthew N Putaraksa
(74) *Attorney, Agent, or Firm* — Sughrue Mion, PLLC

(57) ABSTRACT

A failure handling apparatus (100) is provided with: an acceptance unit (15) that accepts specification of condition information in an execution condition; a code generation unit (16) that generates a program code of a conditional expression based on the specified condition information; a template generation unit (17) that generates an input template of a plurality of failure handling rules, including an input field of a determination criterion value for determining extracted information, based on the program code and an input field of a handling content; and a list generation unit (18) that sets input values, for the input template, in the input fields and stores the input values in a storage unit as a list.

8 Claims, 21 Drawing Sheets

(56) References Cited

U.S. PATENT DOCUMENTS

| | | |
|---|---|---|
| 2005/0015665 A1 | 1/2005 | Kato et al. |
| 2005/0283638 A1 | 12/2005 | Kato |
| 2008/0244319 A1* | 10/2008 | Nehab ................. G06F 11/0709 |
| | | 714/E11.178 |
| 2014/0246488 A1* | 9/2014 | Terwilliger ........ G06Q 20/3276 |
| | | 235/375 |
| 2014/0281748 A1* | 9/2014 | Ercegovac .......... G06F 11/0727 |
| | | 714/49 |
| 2015/0370619 A1 | 12/2015 | Nagura et al. |
| 2016/0196189 A1* | 7/2016 | Miyagi ................... G06F 11/07 |
| | | 714/19 |
| 2020/0097389 A1* | 3/2020 | Smith ................. G06F 11/0793 |
| 2021/0109832 A1* | 4/2021 | Ladkani ................ G06F 11/076 |
| 2023/0305917 A1* | 9/2023 | Zhang ................ G06F 11/0721 |
| | | 714/37 |

FOREIGN PATENT DOCUMENTS

| | | |
|---|---|---|
| JP | 2005-346331 A | 12/2005 |
| WO | 2015/040688 A1 | 3/2015 |

OTHER PUBLICATIONS

Oono, Mitsuhiro, "Operational control and diversion method of failure handling policy for autonomous operation management", IEICE technical report, vol. 105, No. 227, pp. 13-18, Jul. 29, 2006.

* cited by examiner

| RuleSet | ccm.casezone.casedev |
|---|---|
| Import | ccm.casezone.casedev.DecisionTableTest.Message |
| Notes | This decision table is a HelloWorld example decision table |

RuleTable HelloWorld

| | CONDITION | CONDITION | ACTION | ACTION | ACTION | ACTION |
|---|---|---|---|---|---|---|
| | MID==$param2 | message=~$param3 | System.out.println(m.getMessage()); | | m.setMessage("$param");update(m); | m.setStatus($param);update(m); |
| RULE NAME | MESSAGE ID (EXACT MATCH) | MESSAGE BODY (REGULAR EXPRESSION MATCH) | RULE NAME (REQUIRED) | ACTION TYPE (REQUIRED) | ACTION SERVER LIST (REQUIRED) *DEFINE " X" WHEN NOT REQUIRED | ACTION PARAMETER INFORMATION (REQUIRED) *DO NOT USE DOUBLE QUOTATIONS |
| (ARBITRARY) | MSG123 | -.*ABNORMALITY IS DETECTED.*$ | sample1 | mail | x | MAIL_NAME= SET MAIL NAME.MAIL_TO=(MAIL DESTINATION) MAIL_TEMPLATE=(MAIL TEMPLATE NAME) |
| (ARBITRARY) | MSG123 | -.*ABNORMALITY IS DETECTED.*$ | sample2 | ITA | hostname | ITA_NAME= SET ITA NAME.SYMPHONY.CLASS_ID=xx |

CONDITION SECTION: DESCRIBE CONTENTS OF ITEMS AS CONDITIONS FOR RULE EXECUTION. ITEMS CAN BE CUSTOMIZED ACCORDING TO SYSTEM.

ACTION SECTION: DESCRIBE PROCESSING CONTENTS TO BE PERFORMED WHEN CONDITIONS ARE APPLICABLE

| RULE NAME | FAILURE NAME (EXACT MATCH) | FAILURE LEVEL (EXACT MATCH) | SERVER TEMPERATURE (NOT LESS THAN) | CPU USAGE RATE (GREATER THAN) | OCCURRENCE TIME AND DATE [HH:mm] (from) | OCCURRENCE TIME AND DATE [HH:mm] (to) | MEMORY USAGE RATE (NOT MATCH) | RULE NAME | ACTION TYPE | ACTION SERVER LIST | ACTION PARAMETER INFORMATION |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |

CONDITION SECTION / ACTION SECTION

Fig. 11

| RULE NAME | CONDITION SECTION ||||||| ACTION SECTION ||||
|---|---|---|---|---|---|---|---|---|---|---|
| | FAILURE NAME (EXACT MATCH) | FAILURE LEVEL (EXACT MATCH) | SERVER TEMPERATURE (NOT LESS THAN) | CPU USAGE RATE (GREATER THAN) | OCCURRENCE TIME AND DATE [HH:mm] (from) | OCCURRENCE TIME AND DATE [HH:mm] (to) | MEMORY USAGE RATE (NOT MATCH) | RULE NAME | ACTION TYPE | ACTION SERVER LIST | ACTION PARAMETER INFORMATION |
| RULE1 | SERVER TEMPERATURE ABNORMALITY | CRITICAL | 30 | | 06:00 | 18:00 | | rule1 | ITA(ver1) | srv1 | POWER OFF/ON |
| RULE2 | CPU ABNORMALITY | MINOR | | 80 | 12:00 | 13:00 | | rule2 | ITA(ver1) | srv2 | OS REBOOT |
| RULE3 | MEMORY ABNORMALITY | WARNING | | | 06:00 | 18:00 | 90 | rule3 | mail (ver1) | x | WARNING MAIL |

| RULE NAME | FAILURE NAME (EXACT MATCH) | FAILURE LEVEL (EXACT MATCH) | SERVER TEMPERATURE (NOT LESS THAN) | CPU USAGE RATE (GREATER THAN) | OCCURRENCE TIME AND DATE [HH:mm] (from) | OCCURRENCE TIME AND DATE [HH:mm] (to) | MEMORY USAGE RATE (NOT MATCH) |
|---|---|---|---|---|---|---|---|
| | | | | | | | |
| | | | | | | | |
| | | | | | | | |

CONDITION SECTION

| RULE NAME | ACTION TYPE | ACTION SERVER LIST | ACTION PARAMETER INFORMATION | ACTION SUPPRESSION INTERVAL | ACTION SUPPRESSION UPPER LIMIT NUMBER OF TIMES | ACTION SUPPRESSION TIME PERIOD (from) | ACTION SUPPRESSION TIME PERIOD (to) |
|---|---|---|---|---|---|---|---|
| | | | | | | | |
| | | | | | | | |
| | | | | | | | |

ACTION SECTION | ACTION CONTROL SECTION

Fig. 13

CONDITION SECTION

| RULE NAME | FAILURE NAME (EXACT MATCH) | FAILURE LEVEL (EXACT MATCH) | SERVER TEMPERATURE (NOT LESS THAN) | CPU USAGE RATE (GREATER THAN) | OCCURRENCE TIME AND DATE [HH:mm] (from) | OCCURRENCE TIME AND DATE [HH:mm] (to) | MEMORY USAGE RATE (NOT MATCH) |
|---|---|---|---|---|---|---|---|
| RULE1 | SERVER TEMPERATURE ABNORMALITY | CRITICAL | 30 | | 06:00 | 18:00 | |
| RULE2 | CPU ABNORMALITY | MINOR | | 80 | 12:00 | 13:00 | |
| RULE3 | MEMORY ABNORMALITY | WARNING | | | 06:00 | 18:00 | 90 |

ACTION SECTION / ACTION CONTROL SECTION

| RULE NAME | ACTION TYPE | ACTION SERVER LIST | ACTION PARAMETER INFORMATION | ACTION SUPPRESSION INTERVAL | ACTION SUPPRESSION UPPER LIMIT NUMBER OF TIMES | ACTION SUPPRESSION TIME PERIOD (from) | ACTION SUPPRESSION TIME PERIOD (to) |
|---|---|---|---|---|---|---|---|
| rule1 | ITA(ver1) | srv1 | POWER OFF/ON | 3 HOURS | 3 | 6:30 | 8:10 |
| rule2 | ITA(ver1) | srv2 | AP SERVER REBOOT | 10 MINUTES | | | |
| rule3 | mail (ver1) | x | WARNING MAIL | | 5 | | |

Fig. 14

| PATTERN | ACTION SUPPRESSION INTERVAL | ACTION SUPPRESSION UPPER LIMIT NUMBER OF TIMES | ACTION EXECUTION SUPPRESSION METHOD |
|---|---|---|---|
| (1) | NO | NO | EXECUTE ACTION NORMALLY |
| (2) | 5 SECONDS | NO | SUPPRESS EXECUTION OF ACTION OF SAME RULE FOR 5 SECONDS AFTER ACTION EXECUTION |
| (3) | NO | 5 TIMES | SUPPRESS EXECUTION OF ACTION OF SAME RULE 5 TIMES AFTER ACTION EXECUTION |
| (4) | 5 SECONDS | 5 TIMES | COMBINATION OF PATTERNS (2) AND (3) |

Fig. 17

Fig. 20

FAILURE HANDLING APPARATUS AND SYSTEM, RULE LIST GENERATION METHOD, AND NON-TRANSITORY COMPUTER-READABLE MEDIUM

This application is a National Stage Entry of PCT/JP2021/007116 filed on Feb. 25, 2021, which claims priority from Japanese Patent Application 2020-032721 filed on Feb. 28, 2020, the contents of all of which are incorporated herein by reference, in their entirety.

TECHNICAL FIELD

The present disclosure relates to a failure handling apparatus and system, a rule list generation method, and a program thereof, and, in particular, to a failure handling apparatus and system, a rule list generation method, and a program thereof that handle a failure of an information system.

BACKGROUND ART

In a field of operation of an information system, when a failure occurs in the system, measures (handling, restoration processes and the like) are taken against the system in order to return the system to normal operation.

Patent Literature 1 discloses a technique related to an automatic failure recovery method in a failure monitoring device that monitors a failure of a computer system. The failure monitoring device according to Patent Literature 1 includes a storage means for storing failure recovery information including rules defining a recovery operation to be taken when a failure occurs in a computer system. When a failure occurs in a computer system, the failure monitoring device searches for a rule being preset in the failure recovery information and instructs the computer system to perform a failure recovery operation associated with the matching rule.

Patent Literature 2 discloses a technique related to a failure recovery device capable of attempting to recover a failure even when a failure other than failures described in a failure handling rule occurs.

CITATION LIST

Patent Literature

Patent Literature 1: Japanese Unexamined Patent Application Publication No. 2005-346331
Patent Literature 2: Japanese Unexamined Patent Application Publication No. 2003-114811

SUMMARY OF INVENTION

Technical Problem

Defining the failure handling rules for an information system in Patent Literatures 1 and 2 requires describing the rules in a predetermined rule specification language. However, there is a problem that it is highly demanding for a person in charge of operation in terms of skills to describe the rules in the predetermined rule specification language.

The present disclosure has been made in order to solve such a problem and aims to provide a failure handling apparatus and system, a rule list generation method, and a program thereof for easily defining a failure handling rule for an information system.

Solution to Problem

A failure handling apparatus according to a first aspect of the present disclosure includes:
a storage unit configured to store a list of a plurality of failure handling rules in which a handling content relevant to a failure message detected from an information system is associated with an execution condition for executing the handling content against the information system;
an acquisition unit configured to acquire the failure message;
a determination unit configured to determine whether extracted information being extracted from the acquired failure message is applicable to the execution condition for each of the plurality of failure handling rules in the list; and
an execution control unit configured to identify a handling content associated with the execution condition that is determined to be applicable, and execute the identified handling content against the information system, and
the failure handling apparatus further includes:
an acceptance unit configured to accept specification of condition information in the execution condition;
a code generation unit configured to generate a program code of a conditional expression based on the specified condition information;
a template generation unit configured to generate an input template of the plurality of failure handling rules, including an input field of a determination criterion value for determining the extracted information, based on the program code, and an input field of the handling content; and
a list generation unit configured to set input values, for the input template, in the input fields, and store the input values in the storage unit as the list.

A failure handling system according to a second aspect of the present disclosure includes:
a detection unit configured to detect a failure message from an information system;
a storage unit configured to store a list of a plurality of failure handling rules in which a handling content relevant to the detected failure message is associated with an execution condition for executing the handling content against the information system;
an acquisition unit configured to acquire the failure message;
a determination unit configured to determine whether extracted information being extracted from the acquired failure message is applicable to the execution condition for each of the plurality of failure handling rules in the list;
an execution control unit configured to identify a handling content associated with the execution condition that is determined to be applicable, and instruct to execute the identified handling content against the information system; and
an execution unit configured to execute the identified handling content against the information system in accordance with the instruction, and
the failure handling system further includes:
an acceptance unit configured to accept specification of condition information in the execution condition;
a code generation unit configured to generate a program code of a conditional expression based on the specified condition information;
a template generation unit configured to generate an input template of the plurality of failure handling rules, including an input field of a determination criterion value for determining the extracted information, based on the program code, and an input field of the handling content; and a list generation unit configured to set input values, for the input template, in the input fields and store the input values in the storage unit as the list.

A rule list generation method according to a third aspect of the present disclosure, by a failure handling apparatus including:

a storage unit configured to store a list of a plurality of failure handling rules in which a handling content relevant to a failure message detected from an information system is associated with an execution condition for executing the handling content against the information system;

an acquisition unit configured to acquire the failure message;

a determination unit configured to determine whether extracted information being extracted from the acquired failure message is applicable to the execution condition for each of the plurality of failure handling rules in the list; and an execution control unit configured to identify a handling content associated with the execution condition that is determined to be applicable, and execute the identified handling content against the information system, the rule list generation method including:

accepting specification of condition information in the execution condition;

generating a program code of a conditional expression based on the specified condition information;

generating an input template of the plurality of failure handling rules, including an input field of a determination criterion value for determining the extracted information, based on the program code, and an input field of the handling content; and setting input values, for the input template, in the input fields and storing the input values in the storage unit as the list.

A program according to a fourth aspect of the present disclosure causes a computer to execute:

processing of accepting specification of condition information in an execution condition for executing a handling content associated with a failure message detected from an information system against the information system;

processing of generating a program code of a conditional expression based on the specified condition information;

processing of generating an input template of a plurality of failure handling rules, including an input field of a determination criterion value for determining extracted information being extracted from the failure message, based on the program code, and an input field of the handling content;

processing of setting input values, for the input template, in the input fields and storing the input values in a storage apparatus as a list of the plurality of failure handling rules;

processing of acquiring the failure message;

processing of determining whether extracted information being extracted from the acquired failure message is applicable to the execution condition for each of the plurality of failure handling rules in the list; and processing of identifying a handling content associated with the execution condition that is determined to be applicable and executing the specified handling content against the information system.

Advantageous Effects of Invention

The present disclosure is able to provide a failure handling apparatus and system, a rule list generation method, and a program thereof for easily defining a failure handling rule for an information system.

BRIEF DESCRIPTION OF DRAWINGS

FIG. 7 is a diagram illustrating an example of the rule list according to the second example embodiment;

FIG. 10 is a diagram illustrating an example of an input template of the rule list according to the second example embodiment;

FIG. 11 is a diagram illustrating the rule list and a rule input example according to the second example embodiment;

FIG. 13 is a diagram illustrating an example of an input template of a rule list according to a third example embodiment;

FIG. 14 is a diagram illustrating the rule list and a rule input example according to the third example embodiment;

FIG. 17 is a diagram illustrating an example of a combination pattern of an action suppression interval and an upper limit number of times according to the third example embodiment;

FIG. 20 is a diagram illustrating an example of a case in which the action suppression interval and the upper limit number of times are set to Yes according to the third example embodiment.

EXAMPLE EMBODIMENT

The following describes example embodiments of the present disclosure in detail with reference to the drawings. In each drawing, the same or corresponding elements are designated by the same signs, and duplicate descriptions will be omitted as necessary for clarification of the description.

First Example Embodiment

Figure 1:
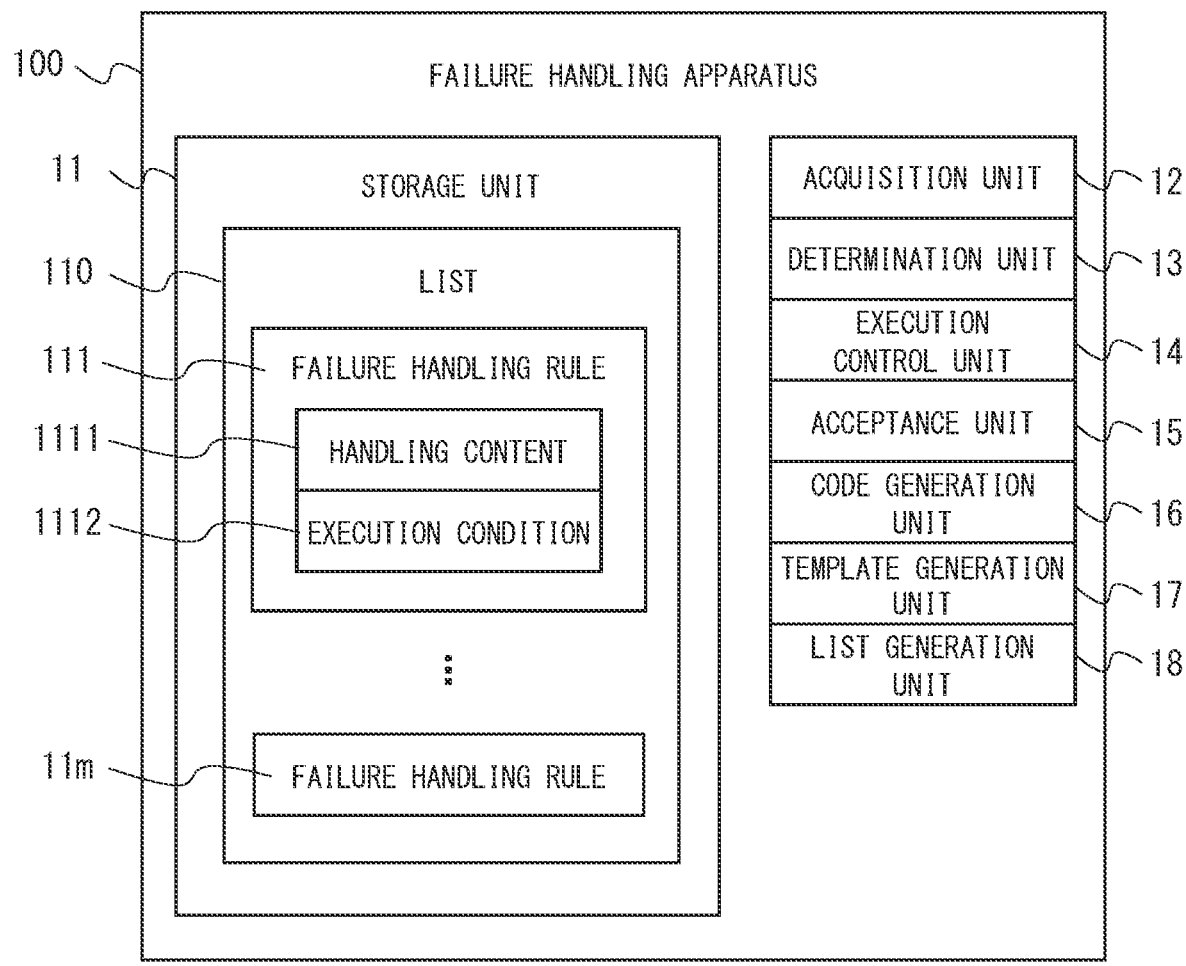
FIG. 1 is a block diagram illustrating the configuration of a failure handling apparatus according to a first example embodiment.

FIG. 1 is a block diagram illustrating the configuration of a failure handling apparatus 100 according to a first example embodiment. The failure handling apparatus 100 is an information processing apparatus or system for performing restoration or continuation of operation of an information system by performing predetermined handling when a failure message is detected in the information system to be monitored (not shown).

The failure handling apparatus 100 includes a storage unit 11, an acquisition unit 12, a determination unit 13, an execution control unit 14, an acceptance unit 15, a code generation unit 16, a template generation unit 17, and a list generation unit 18. The storage unit 11 is a storage area that stores a list 110 of a plurality of failure handling rules 111 to 11m (m is an integer of 2 or more). Each of the failure handling rules 111 and the like is information in which a handling content 1111 and an execution condition 1112 are associated. The handling content 1111 is the content of handling associated with a failure message that is detected from an information system and is, for example, a predetermined command or script against the information system or a parameter for generating the command or script. The execution condition 1112 is a condition for executing the handling content 1111 against the information system.

The acquisition unit 12 acquires a failure message that is detected from an information system. The determination unit 13 determines whether extracted information that is extracted from the acquired failure message is applicable to the execution condition 1112 for each of the plurality of failure handling rules 111 and the like in the list 110. Note that the extracted information is a character string or a numerical value. The execution control unit 14 identifies the handling content 1111 associated with the execution condition 1112 that is determined to be applicable and causes to execute the specified handling content 1111 against the information system.

The acceptance unit 15 accepts specification of condition information in the execution condition 1112. When the execution condition 1112 is a comparison condition between operands A and B, the condition information is information (a character string or the like) as a "comparison operator." For example, the condition information is information indicating that "(A and B are) equal," "(A is) greater (than B)," "(A and B) match a regular expression," "(A) contains (B)" or the like.

The code generation unit 16 generates a program code of a conditional expression based on the specified condition information. For example, if the condition information is "equal," the generated program code corresponds to "A==B."

The template generation unit 17 generates an input template for a plurality of failure handling rules, based on the aforementioned program code. Here, the input template includes an input field of a determination criterion value and an input field of a handling content for each failure handling rule. The determination criterion value is a value for determining the extracted information, based on the program code. For example, when the program code is "A==B," the extracted information corresponds to "B" and the determination criterion value corresponds to "A." That is, the input field of "a determination criterion value for determining the extracted information, based on the program code" is the input field of the value "A."

Also, the handling content does not have to be a final command or script. For example, the handling content includes identification information of the handling, a system (server) to be handled, a parameter used in the final command, and/or the like.

The list generation unit 18 sets input values, for the input template, in the input fields and stores the input values as a list 110 in the storage unit 11.

Figure 2:
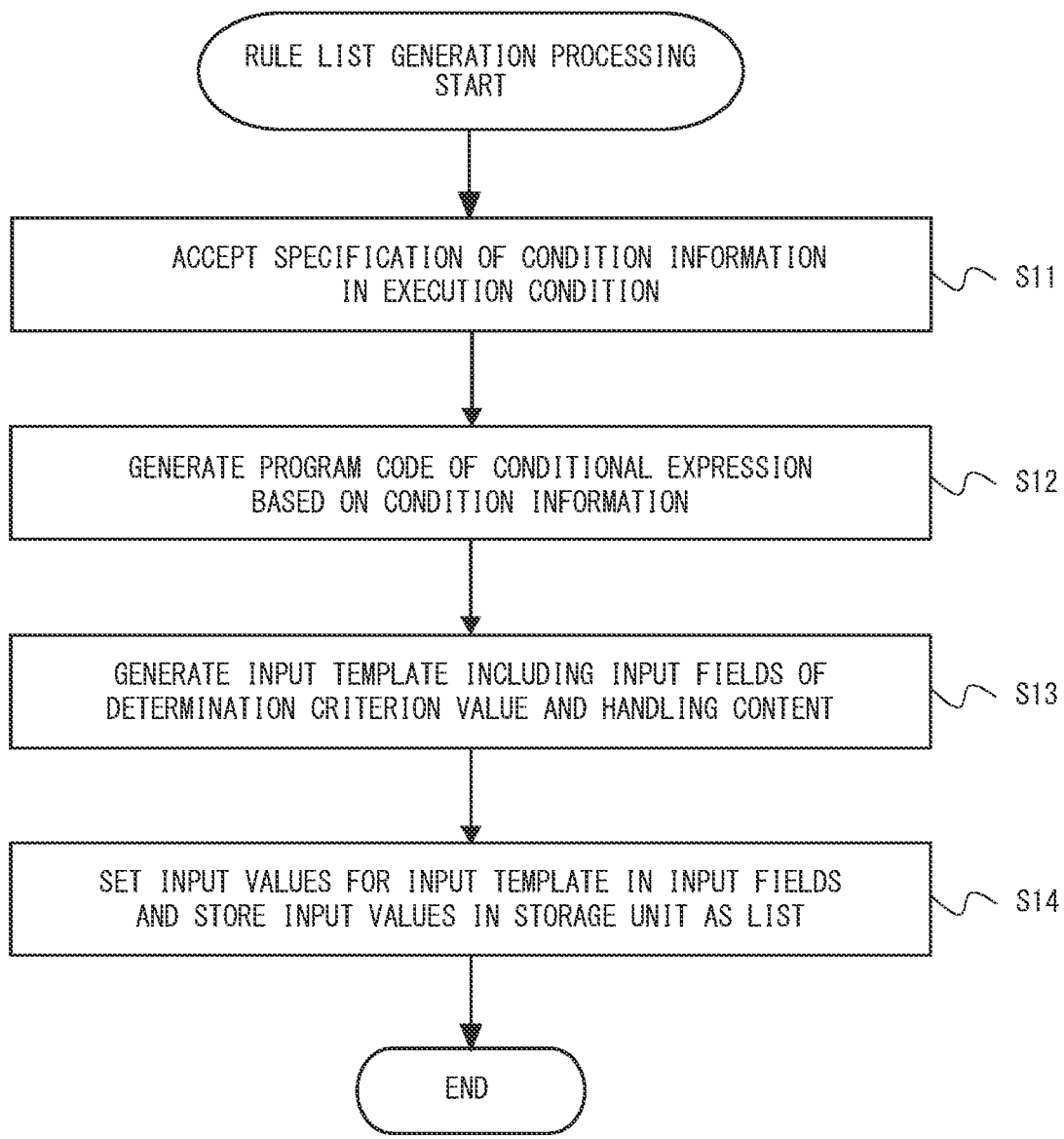
FIG. 2 is a flowchart illustrating the flow of rule list generation processing according to the first example embodiment.

FIG. 2 is a flowchart illustrating the flow of rule list generation processing according to the first example embodiment. First, the acceptance unit 15 accepts specification of condition information in an execution condition 1112 (S11). Next, the code generation unit 16 generates a program code of a conditional expression based on the specified condition information (S12). Then, the template generation unit 17 generates an input template including an input field of a determination criterion value and an input field of a handling content, based on the program code (S13). Thereafter, the list generation unit 18 sets the input values, for the input template, in the input fields and stores the input values as a list 110 in the storage unit 11 (S14).

Figure 3:
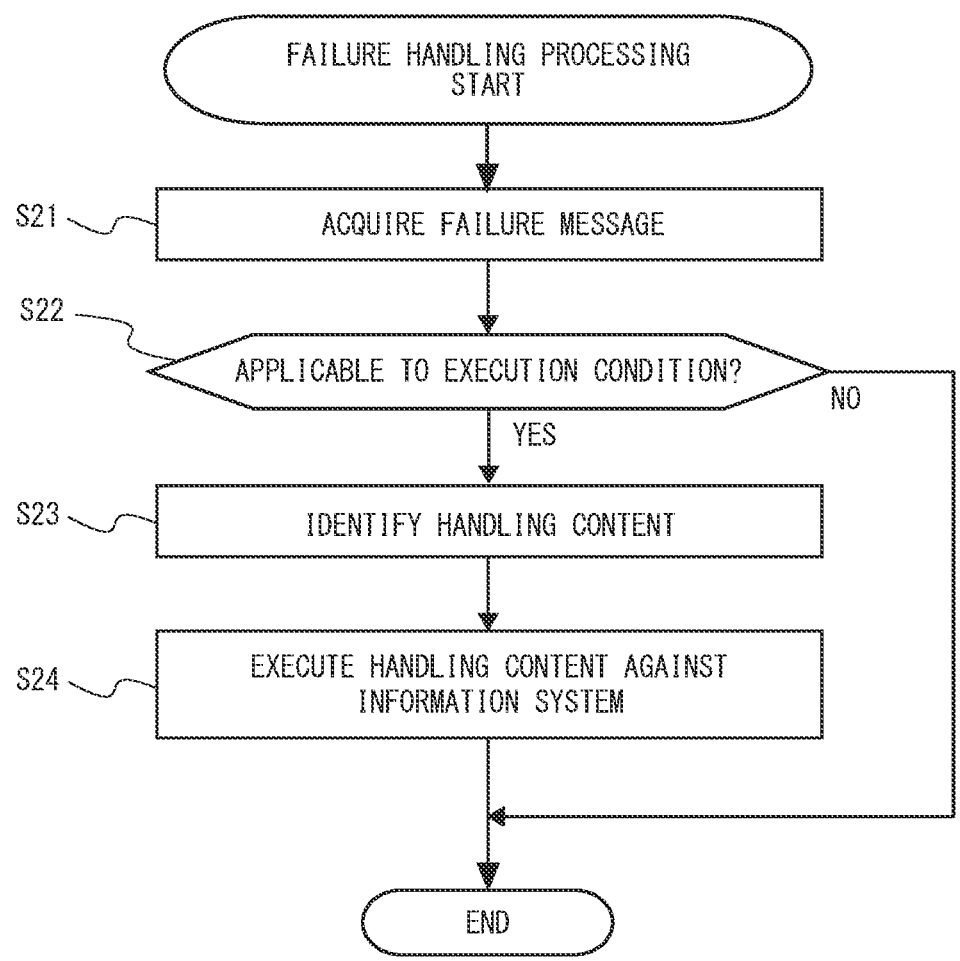
FIG. 3 is a flowchart illustrating the flow of failure handling processing according to the first example embodiment.

FIG. 3 is the flowchart illustrating the flow of failure handling processing according to the first example embodiment. First, the acquisition unit 12 acquires a failure message that is detected from the information system (S21). At this time, the failure handling apparatus 100 extracts one or more pieces of extracted information from the acquired failure message, based on a predetermined logic. Next, the determination unit 13 determines whether the extracted information is applicable to the execution condition 1112 for each of the failure handling rules 111 and the like (S22). At this time, the determination unit 13 reads the list 110 from the storage unit 11 into a memory (not shown), interprets the execution condition 1112 in each failure handling rule 111 and the like, and determines whether the extracted information satisfies the conditional expression.

When it is determined that the extracted information is applicable at step S22, the execution control unit 14 identifies a handling content 1111 (S23). Then, the execution control unit 14 executes the specified handling content 1111 against the information system (S24). For example, the execution control unit 14 executes a command associated with the handling content 1111 on the information system. Alternatively, the execution control unit 14 separately inputs a handling content 1111 into a command execution tool and causes it to execute a command associated with the handling content 1111 on the information system as a destination. After step S24 or when it is determined that the extracted information is not applicable at step S22, the execution control unit 14 ends the failure handling processing.

Thus, the present example embodiment deals with a case in which a program code is required for the execution condition 1112 of the failure handling rule 111. In other words, programming is required to define a failure handling rule. However, since such programming is highly demanding for a person in charge of operation in terms of skills, it is difficult to define a large number of failure handling rules. Thus, the present embodiment generates (converts) a program code of a conditional expression, based on condition information by accepting specification of condition information in an execution condition of a handling content and generates an input template including an input field of a determination criterion value associated with the program code. In this way, a user such as a person in charge of operation can define a rule list including a plurality of failure handling rules by inputting only operation-related information such as condition information, a determination criterion value, and a handling content. In other words, a person in charge of operation can easily define failure handling rules for an information system without programming.

Note that the failure handling apparatus 100 includes a processor, a memory, and a storage apparatus as components not shown in the drawings. The storage apparatus further stores a computer program in which the processing of the rule list generation method according to the present example embodiment is implemented. The program may further implement the processing of the operation handling method. However, the processing of the operation handling method may be implemented in another program. Then, the processor reads the computer program from the storage apparatus into the memory and executes the computer program. In this way, the processor realizes the functions of the acquisition unit 12, the determination unit 13, the execution control unit 14, the acceptance unit 15, the code generation unit 16, the template generation unit 17, and the list generation unit 18.

Alternatively, the acquisition unit 12, the determination unit 13, the execution control unit 14, the acceptance unit 15, the code generation unit 16, the template generation unit 17, and the list generation unit 18 may each be realized with dedicated hardware. Further, some or all of the components of each device may be realized by a general-purpose or dedicated circuitry, a processor, or the like, or a combination thereof. The components may be configured by a single chip or may be configured by a plurality of chips connected via a bus. Some or all of the components of each device may be realized by a combination of the above-mentioned circuitry or the like and a program. As the processor, a Central Processing Unit (CPU), a Graphics Processing Unit (GPU), a field-programmable gate array (FPGA), or the like can be used.

Further, when some or all of the components of the failure handling apparatus 100 are realized by a plurality of information processing apparatuses, circuitries, and/or the like, the plurality of information processing apparatuses, circuitries, and/or the like may be centrally arranged or distributed. For example, the information processing apparatuses, circuitries, and/or the like may be realized as a form in which they are connected via a communication network, such as a client-server system and a cloud computing system. Further, the functions of the failure handling apparatus 100 may be provided in a Software as a Service (SaaS) format.

Second Example Embodiment

Figure 4:
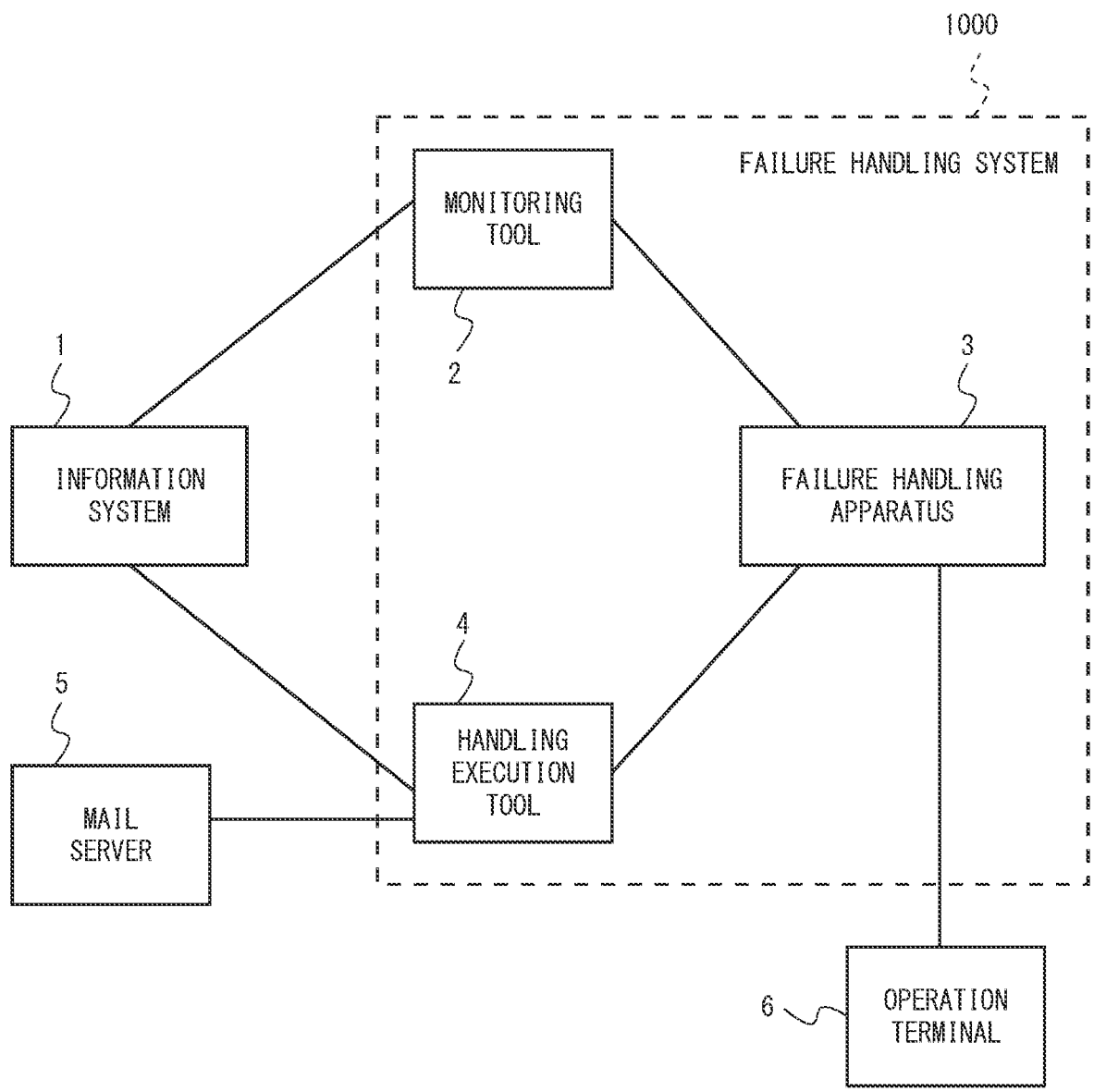
FIG. 4 is a block diagram illustrating the overall configuration of a failure handling system according to a second example embodiment.

The second example embodiment is a specific example of the above-described first example embodiment. FIG. 4 is a block diagram illustrating the overall configuration of a failure handling system 1000 according to the second example embodiment. The failure handling system 1000 is an information system that monitors an information system 1 and includes a monitoring tool 2, a failure handling apparatus 3, and a handling execution tool 4. The information system 1 is an information system to be monitored and is configured by one or more computers. The monitoring tool 2 monitors an output message from the information system 1 and, when a predetermined failure message is detected, notifies the failure handling apparatus 3 of the detected failure message. The monitoring tool 2 is an example of the detection unit. The failure handling apparatus 3 is an example of the above-described failure handling apparatus 100, which generates an action command, based on a rule list and a failure message that is acquired from the monitoring tool 2 and outputs the generated action command to the handling execution tool 4. The failure handling apparatus 3 can also be referred to as a rule engine. For example, the failure handling apparatus 3 analyzes the rule list, interprets an execution condition for each of the plurality of rules in the list, and causes to execute an action (command) of the rule associated with the execution condition to which the acquired failure message applies. The handling execution tool 4 executes the action command input from the failure handling apparatus 3 on a specified destination. For example, when the destination is the information system 1, the handling execution tool 4 executes the action command on the information system 1. Alternatively, when the destination is a mail server 5, the handling execution tool 4 outputs an outgoing mail to an operation terminal 6 by executing an action command. The handling execution tool 4 is an example of the execution unit. Note that the monitoring tool 2 and the handling execution tool 4 are realized by a computer program executed on the same computer as the failure handling apparatus 3 or a different computer.

The failure handling apparatus 3 is also connected to the operation terminal 6. The operation terminal 6 is a computer operated by a person in charge of operation. The failure handling apparatus 3 generates an input template of a rule list according to an input from the operation terminal 6 and generates the rule list according to the input to the input template via the operation terminal 6.

Figure 5:
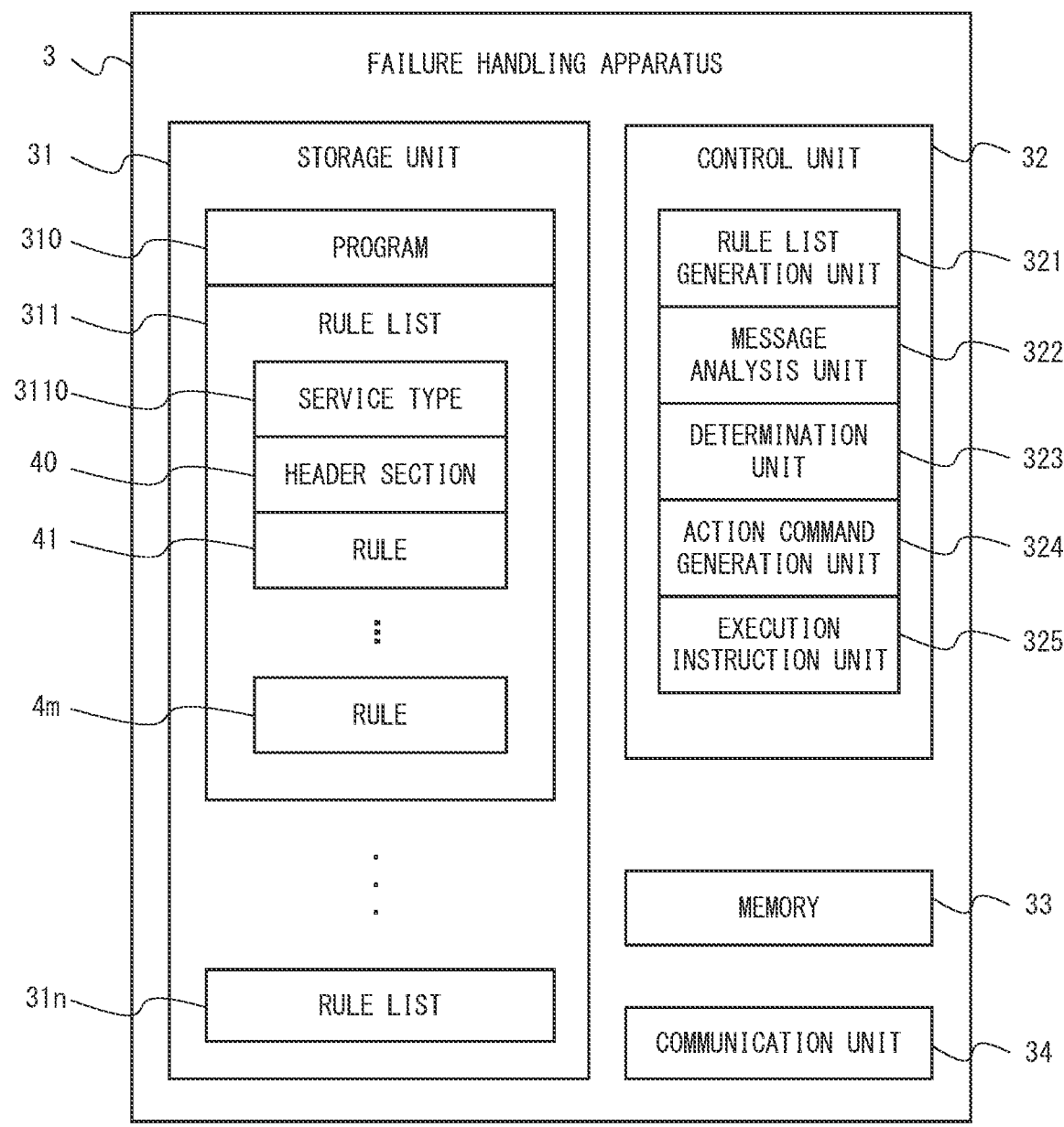
FIG. 5 is a block diagram illustrating the configuration of a failure handling apparatus according to the second example embodiment.

FIG. 5 is a block diagram illustrating the configuration of the failure handling apparatus 3 according to the second example embodiment. The failure handling apparatus 3 includes a storage unit 31, a control unit 32, a memory 33, and a communication unit 34. The storage unit 31 is an example of the above-described storage unit 11 and stores a program 310 and rule lists 311 to 31$n$ ($n$ is an integer of 2 or more). The program 310 is a computer program in which the rule generation processing and the failure handling processing according to the present embodiment are implemented. Note that the storage unit 31 may store an Operating System (OS) as a component not shown in the drawings. Each of the rule list 311 and the like includes a service type 3110, a header section 40, and rules 41 to 4$m$. In other words, the rule list is stored for each service type.

Figure 6:
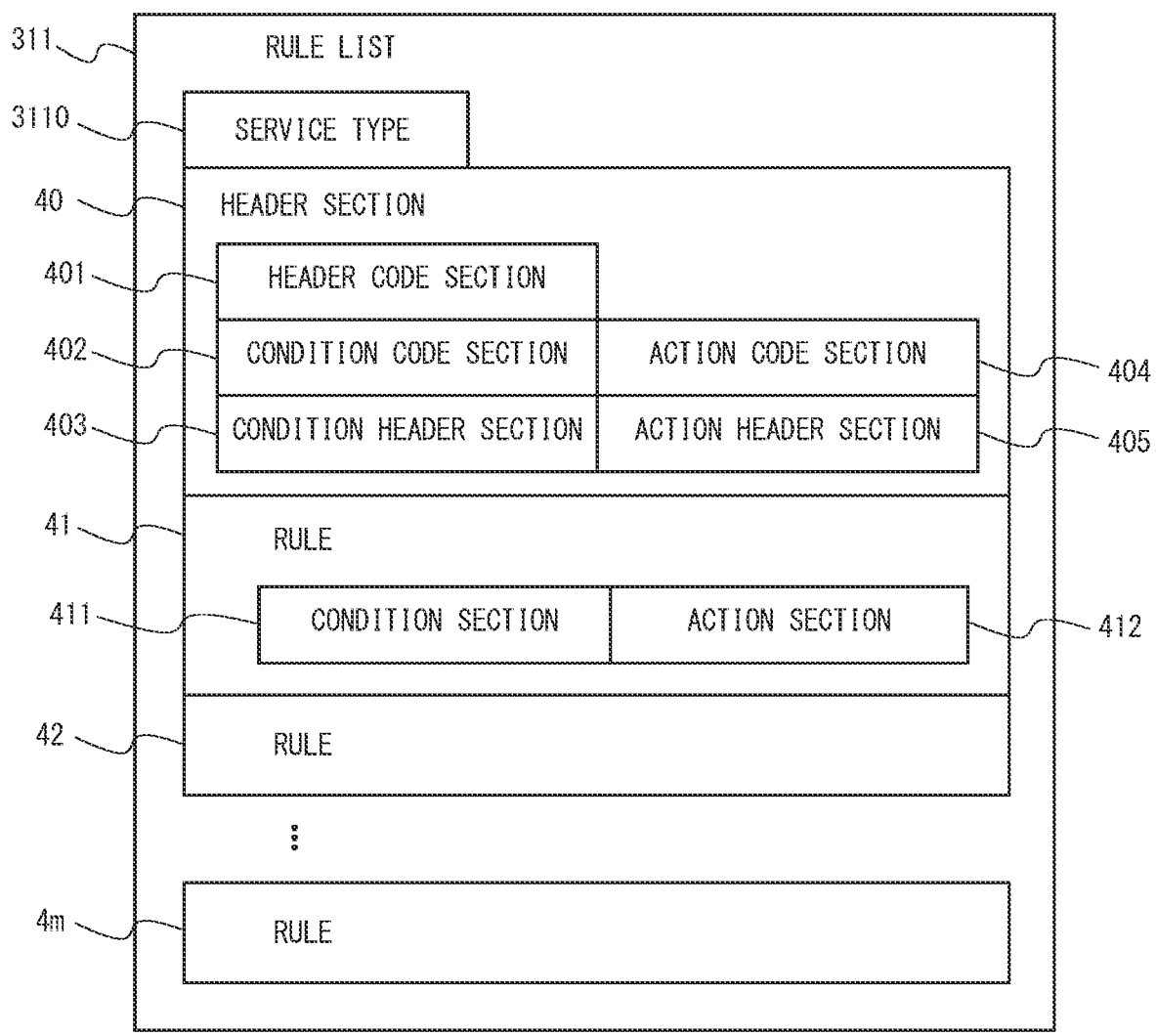
FIG. 6 is a block diagram illustrating the configuration of a rule list according to the second example embodiment.

FIG. 6 is a block diagram illustrating the configuration of the rule list 311 according to the second example embodiment. FIG. 7 is a diagram illustrating an example of the rule list 311 according to the second example embodiment. The service type 3110 is information indicating a specific service type among a plurality of types of services provided in the information system 1. The service type 3110 is, for example, a service ID or the like. The rule list 311 includes one service type 3110. That is, each rule list is separated for each service type.

The header section 40 includes a header code section 401, a condition code section 402, a condition header section 403, an action code section 404, and an action header section 405. The header code section 401 is a field for describing a program code that is commonly used in the rule list 311. Note that the header code section 401 may have a fixed value. The header code section 401 is, for example, a ruleset name, an import statement, and/or the like. The condition code section 402 is a program code for each column of the condition section of each rule. The condition code section 402 is an example of the above-described "program code of a conditional expression based on specified condition information." The condition header section 403 is the column name of the condition section of each rule. The action code section 404 is a program code for each column of the action section of each rule. Note that the action code section 404 may have a fixed value. The action header section 405 is the column name of the action section of each rule.

The rule 41 includes a condition section 411 and an action section 412. The condition section 411 corresponds to the above-described determination criterion value (and the input field thereof). The action section 412 corresponds to the handling content (and the input field thereof). Note that the number of columns (items) of the condition section is variable. The rules 42 to 4m are just like the rule 41. The rule lists 312 to 31n are just like the rule list 311.

Return to FIG. 5 to continue the explanation.

The memory 33 is a volatile storage device such as random access memory (RAM) and is a storage area for temporarily retaining information during the operation of the control unit 32. The communication unit 34 is an interface that performs input/output with the outside of the failure handling apparatus 3. For example, the communication unit 34 receives a processing request or the like from the operation terminal 6 and outputs the received processing request to the control unit 32. The communication unit 34 performs output in accordance with an instruction from the control unit 32.
Alternatively, the communication unit 34 receives a failure message from the monitoring tool 2 and outputs the received failure message to the control unit 32. The communication unit 34 also receives an action command from the control unit 32 and outputs the action command to the handling execution tool 4.

The control unit 32 is a processor, that is, a control device that controls the components of the failure handling apparatus 3. The control unit 32 reads the OS and the program 310 from the storage unit 31 into the memory 33 and executes the OS and the program 310. In this way, the control unit 32 realizes the functions of the rule list generation unit 321, the message analysis unit 322, the determination unit 323, the action command generation unit 324, and the execution instruction unit 325.

The rule list generation unit 321 generates and outputs an input template of a list in response to a rule list generation request from the operation terminal 6, sets input values, for the input template, in the input fields, and stores the input values in the storage unit 31 as the rule list 311 or the like. The message analysis unit 322 analyzes a failure message acquired from the monitoring tool 2, extracts extracted information, and outputs the extracted information to the determination unit 323. The determination unit 323 determines a service type from the extracted information and identifies the corresponding rule list. Then, the determination unit 323 interprets the condition section of each rule of the identified rule list and determines whether the extracted information is applicable to a conditional expression. The action command generation unit 324 identifies an action section in the rule determined to be applicable by the determination unit 323 and generates an action command from the action section. The execution instruction unit 325 instructs the handling execution tool 4 to execute the generated action command. Note that the rule list generation unit 321 is a specific example of the above-described acceptance unit 15, code generation unit 16, template generation unit 17, and list generation unit 18. The message analysis unit 322 is a specific example of the above-described acquisition unit 12. The determination unit 323 is a specific example of the above-described determination unit 13. The action command generation unit 324 and the execution instruction unit 325 are specific examples of the above-described execution control unit 14.

Figure 8:
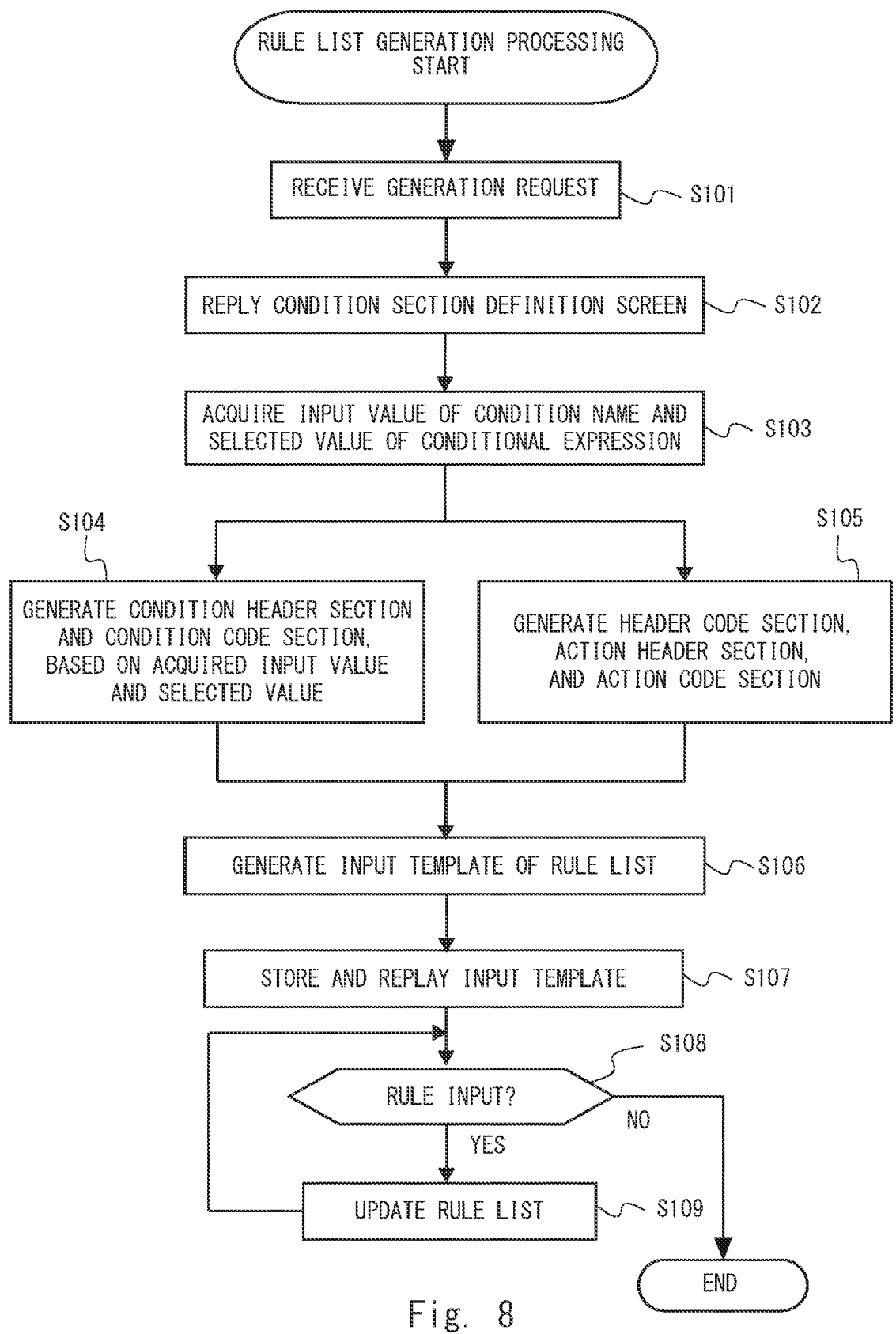
FIG. 8 is a flowchart illustrating the flow of rule list generation processing according to the second example embodiment.

FIG. 8 is a flowchart illustrating the flow of rule list generation processing according to the second example embodiment. First, a person in charge of operation enters a rule list generation start to the operation terminal 6. Accordingly, the operation terminal 6 transmits a rule list generation request to the failure handling apparatus 3. Then, the rule list generation unit 321 of the failure handling apparatus 3 receives the rule list generation request from the operation terminal 6 (S101).

Figure 9:
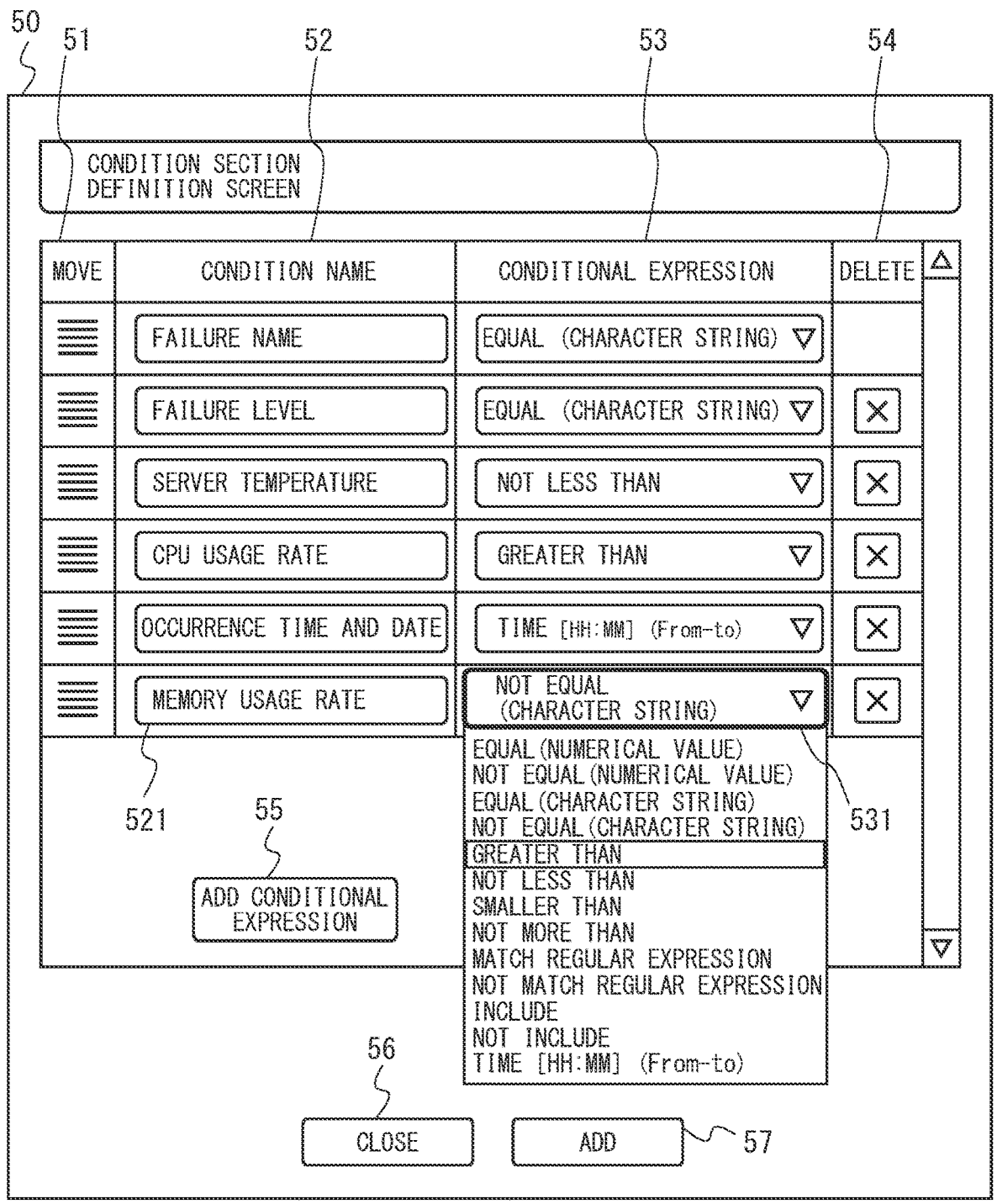
FIG. 9 is a diagram illustrating an example of a condition section definition screen according to the second example embodiment.

Next, the rule list generation unit 321 returns a condition section definition screen to the operation terminal 6 (S102). In response, the operation terminal 6 displays the received condition section definition screen on a display or the like. FIG. 9 is a diagram illustrating an example of the condition section definition screen 50 according to the second example embodiment. The move section 51 is a field for accepting an instruction for changing the order of each row. For example, the person in charge of operation can drag the move section 51 of a particular row with a mouse or the like to move it to a desired row position.

The condition name 52 is a field for inputting a condition name (the column name of a condition section) in a rule list. The conditional expression 53 is a field for selecting the above-described condition information. The delete 54 is a field for accepting deletion of a conditional expression (the corresponding row). The add conditional expression button 55 is a field for accepting addition of a conditional expression. The close button 56 is a button for closing the condition section definition screen 50 without generating an input template for a rule list. The add button 57 is a button for starting generation of an input template of a rule list. FIG. 9 illustrates a situation in which the conditional expression selection field 531 in the condition name input field 521 "memory usage rate" is pressed and "greater than" is about to be selected. The options in the conditional expression selection field 531 are examples of condition information.

Return to FIG. 8 to continue the explanation. When the add button 57 is pressed by the person in charge of operation, the operation terminal 6 transmits the condition name entered in the condition name 52 of the condition section definition screen 50, the condition information selected in the conditional expression 53, and the sequential order of each condition to the failure handling apparatus 3. Accordingly, the rule list generation unit 321 acquires the input value of the condition name, the selected value (condition information) of the conditional expression, and the sequential order of each condition from the operation terminal 6 (S103).

Then, the rule list generation unit 321 generates a condition header section 403 and a condition code section 402, based on the acquired input value, the selected value, and the sequential order of each condition (S104). For example, the example of FIG. 7 illustrates when the condition name "message ID" is in the order "1", at which time, the rule list generation unit 321 generates a code "MID==$param2" in the condition code section 402. Here, the "2" in "$param2" corresponds to the sequential order. That is, if the sequential order is "2," the code becomes "$param 3." In this case, the rule list generation unit 321 generates a code "message==$param 3" in the condition code section 402. Note that, in this example, the left side "MID" and "message" may be fixed or predefined depending on the condition name. The rule list generation unit 321 also generates a header code section 401, an action code section 404, and an action header section 405 (S105). Note that the header code section 401, the action code section 404, and the action header section 405 may have fixed values.

After steps S104 and S105, the rule list generation unit 321 generates an input template of a rule list (S106). Here, a case in which the rule list generation unit 321 generates an input template in a spreadsheet format with a plurality of cells is illustrated. First, the rule list generation unit 321 sets a header code section 401 at the top of the input template as illustrated in FIG. 7. Then, the rule list generation unit 321 sets a column of the condition section in accordance with the sequential order of each condition entered in the condition section definition screen 50. At this time, the rule list generation unit 321 sets the condition name (the condition header section 403) entered in the condition section definition screen 50 in each column of the corresponding order. In addition, the rule list generation unit 321 sets a condition code section 402 in association with each column. Specifically, as illustrated in FIG. 7, a condition code section 402 is set in the cell above the column name. The rule list generation unit 321 then sets an action header section 405 to the right side of the column of the condition header section 403. Similarly, the rule list generation unit 321 sets an action code section 404 to the right side of the condition code section 402. However, the rule list generation unit 321 hides the header section 40 in the input template. This makes it possible to prevent the person in charge of operation from accidentally editing the header section 40. Note that the header section 40 may instead be displayed in the input template.

The rule list generation unit 321 then stores the input template in the storage unit 31 and returns the input template to the operation terminal 6 (S107). At this time, the rule list generation unit 321 stores a predetermined service type 3110 in association with the input template. For example, it is assumed that the rule list generation unit 321 separately accepts specification of a service type to be associated with the rule list from the operation terminal 6. Further, the operation terminal 6 displays the received input template on a display or the like.

FIG. 10 is a diagram illustrating an example of an input template of the rule list according to the second example embodiment. FIG. 10 is a display example on the operation terminal 6, illustrating that the header section 40 is hidden and that the input field of each rule is empty.

Return to FIG. 8 to continue the explanation. Thereafter, the person in charge of operation inputs values into the condition section and action section in each rule of the input template. In response, the operation terminal 6 transmits the input values of each rule to the failure handling apparatus 3. Then, the rule list generation unit 321 receives the input values of the rule from the operation terminal 6 (Yes at S108), sets the received input values in the corresponding input fields, and registers (updates) in the storage unit 31 as the rule list 311 (S109). Then, the process returns to step S108.

FIG. 11 is a diagram illustrating the rule list and a rule input example according to the second example embodiment. Here, an example in which the condition section and the action section have been input with regard to three rules is illustrated.

Return to FIG. 8 to continue the explanation. When the rule list generation unit 321 receives an instruction to end the input from the operation terminal 6 (NO at S108), the rule list generating processing ends.

Figure 12:
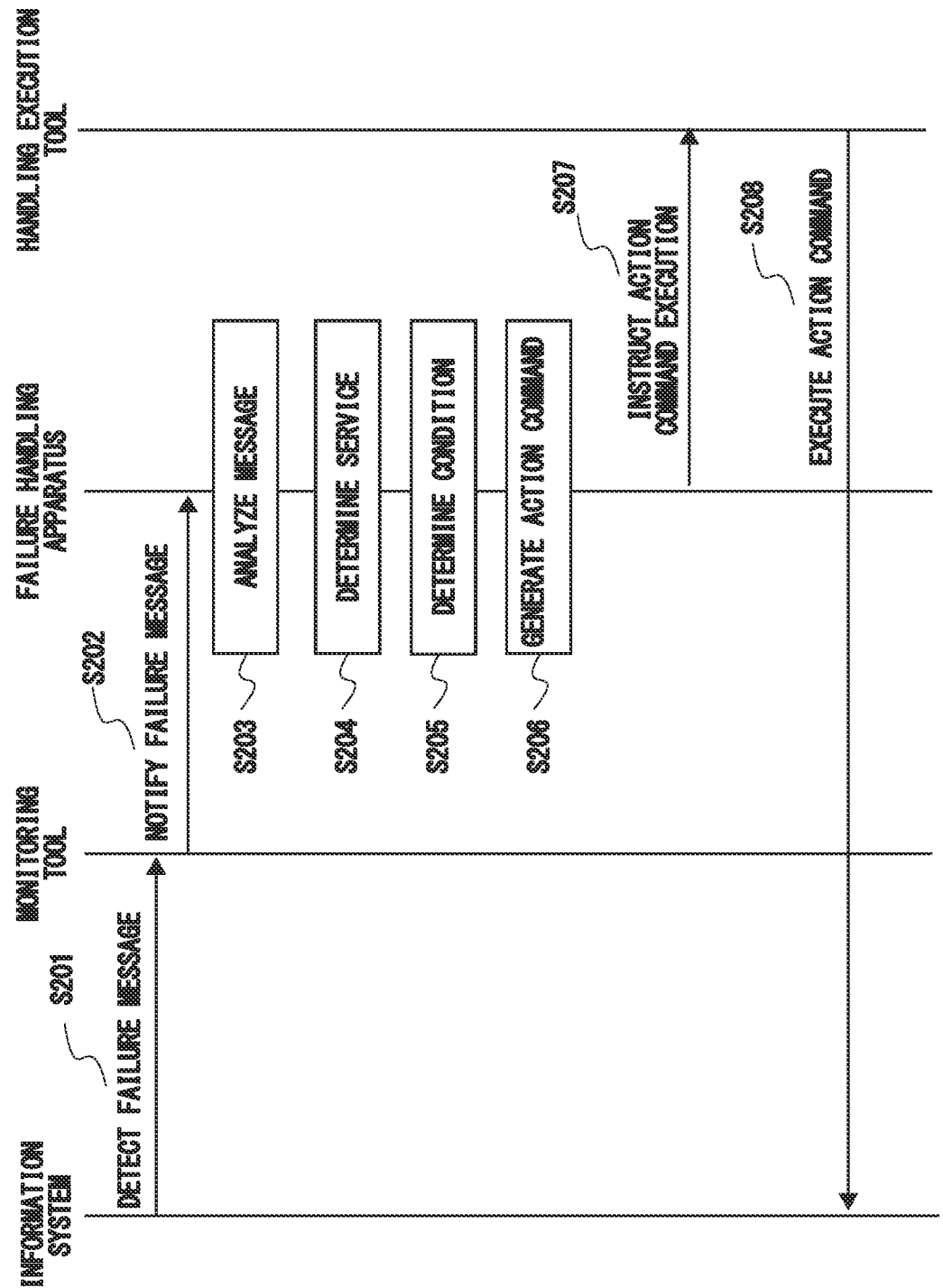
FIG. 12 is a sequence diagram illustrating the flow of failure handling processing according to the second example embodiment.

FIG. 12 is a sequence diagram illustrating the flow of failure handling processing according to the second example embodiment. First, the monitoring tool 2 monitors the information system 1 and detects a failure message (S201). The monitoring tool 2 then notifies the failure handling apparatus 3 of the detected failure message (S202).

Then, the message analysis unit 322 analyzes the failure message acquired from the monitoring tool 2 and extracts the extracted information (S203). For example, the message analysis unit 322 extracts a message ID, a message body, a service type, a failure name, a failure level, a server temperature, a CPU usage rate, occurrence date and time (time of day and minute), a memory usage rate, and/or the like from the failure message as extracted information. Note that the extracted information is not limited thereto.

The determination unit 323 then determines the service type from the extracted information (S204). Accordingly, the determination unit 323 identifies a rule list associated with the determined service type. Then, for each of the plurality of failure handling rules in the identified rule list, the determination unit 323 determines whether the extracted information is applicable to the condition section (S205). In the example of FIG. 11, when the failure name is "server temperature abnormality," the failure level is "critical," the server temperature is not less than "30" degrees, and the occurrence date and time is between "06:00" and "18:00," the determination unit 323 determines that rule 1 is applicable. In other words, the determination unit 323 identifies rule 1 as a rule of which extracted information satisfies the execution conditions.

Then, the action command generation unit 324 identifies an action section in the identified rule and generates an action command from the action section (S206). In the example of FIG. 11, the action command generation unit 324 generates an action command to power off and on the information system 1. Also, in this example, the action command generation unit 324 identifies the ITA (handling execution tool 4) as an action type and identifies "srv1" as an action server list (the server of the information system 1). The execution instruction unit 325 then outputs an action command execution instruction to the handling execution tool 4 to cause the generated action command to be executed against "srv1" of the information system 1 (S207). Note that in the case of the action type "mail," the execution instruction unit 325 conducts an execution instruction to the mail server 5 via the handling execution tool 4. However, the execution instruction unit 325 may output a warning email directly to the mail server 5.

The handling execution tool 4 executes an action command in accordance with the received action command execution instruction (S208). In the example of FIG. 11, the handling execution tool 4 remotely powers off and on the "srv1" of the information system 1.

As such, in the present example embodiment, in a similar manner to the first example embodiment, the person in charge of operation only has to enter a condition name and select a conditional expression for the number of rules so that the rule list generation unit 321 generates an input template in which a program code is embedded. In other words, a condition code section 402 is embedded in each column of the condition section of the input template. Similarly, an action code section 404 is embedded in each column of the action section of the input template. Furthermore, a header code section 401 is embedded in the input template. Accordingly, the person in charge of operation can generate a rule list that can be interpreted by the rule engine by simply entering a condition section and an action section in an individual failure handling rule using the knowledge necessary for operation without programming.

In the present embodiment, the rule lists are separated for each service type, and thus the maintenance of the rule lists can be carried out by dividing the work among service personnel. Furthermore, when determining the conditions of a failure message, the conditions are narrowed down to those of a rule list associated with the applicable service, suppressing the number of times of determination for determining the rule to which the extracted information applies, thereby improving the processing efficiency.

Third Example Embodiment

The third example embodiment is an improvement example of the above-described second example embodiment. That is, when the rule list generation unit 321 receives an input of an execution suppression condition for a specific failure handling rule, the rule list generation unit 321 updates the rule list by further associating the execution suppression condition with the execution condition of the specific failure handling rule. Then, when the execution condition that is determined to be applicable is associated with the execution suppression condition, the determination unit 323 determines whether the execution suppression condition is satisfied. If the execution suppression condition is satisfied, the execution instruction unit 325 suppresses the execution of the specified handling content. Conversely, when the execution condition is satisfied and the execution suppression condition is not satisfied, the execution instruction unit 325 instructs the execution of the specified handling content. The execution of handling can be flexibly controlled, for example, such as suppressing the handling even when the execution condition is satisfied, depending on the characteristics of the failure and the state in which the information system would be after the handling.

The execution suppression condition may also include an upper limit number of times per unit time for performing a handling content to which the execution suppression condition is associated. In this case, when the determination unit 323 determines that the number of times per unit time for executing the handling content exceeds the upper limit number of times, the determination unit 323 determines that the execution suppression condition is satisfied. For example, when similar failures occur in succession, executing the same handling each time may in turn result in a failure. Specifically, when the temperature of a server exceeds a specified value, the rotation speed of the fan in the server room can be raised as handling. In such a case, even if the handling is taken once, the server temperature does not necessarily fall below the specified value immediately, and the same failure occurs continuously and the execution condition is satisfied. However, if the rotation speed of the fan is increased each time the same failure occurs, an unexpected failure (a secondary failure) may occur. Therefore, in such a case, it is desirable to suppress the execution of the handling, which can be achieved by the present example embodiment.

Alternatively, the execution suppression condition may include an interval for suppressing the execution of the handling content to which the execution suppression condition is associated. In this case, when the determination unit 323 determines that the interval has not elapsed since the last execution of the corresponding handling content, the determination unit 323 determines that the execution suppression condition is satisfied. In this way, when similar failures occur in succession and the handling takes time to effect after the handling is executed, excessive execution of the handling can be suppressed, suppressing a secondary failure, unnecessary power consumption, and/or the like.

Further, the execution suppression condition may be a combination of the above-described upper limit number of times and the above-described interval for the associated handling content. This also allows fine-grained control over the execution of handling.

Furthermore, the execution suppression condition may include a time period for suppressing the execution of the corresponding handling content to which the execution suppression condition is associated. In this case, when the determination unit 323 determines that the current time is included in the time period, the determination unit 323 determines that the execution suppression condition is satisfied. For example, there may be a case in which certain handling is desired to be executed after the operation is verified. It is assumed that only definitions are made in the rule list in advance. In such a case, it is desirable to suppress the execution of handling during a specific time period. Also, if the handling is to power off and on the server, it may be desirable to suppress the execution during a certain time period. Addressing these cases can be realized by the present example embodiment.

Note that the other components are equivalent to those in the second example embodiment, so illustrations and detailed descriptions of the common parts are omitted.

FIG. 13 is a diagram illustrating an example of an input template of a rule list according to the third example embodiment. FIG. 13 illustrates that the rule list generation unit 321 generates the input template by adding a column of an action control section to the right of the action section. The action control section includes, for example, an action suppression interval and an action suppression upper limit number of times, as well as, an action suppression time period (from) and (to). However, the action control section is not limited to these. Here, the action control section is an example of the execution suppression condition. In addition, "action suppression time period (from)" and "action suppression time period (to)" are also an example of the execution suppression condition. Note that it is assumed that the rule list generation unit 321 generates a program code (a code section) associated with an action control section (a header section) as in step S105 above, and the code section is hidden. This prevents the person in charge of operation from accidentally editing the code section. Note that the code section may instead be displayed in the input template.

FIG. 14 is a diagram illustrating the rule list and a rule input example according to the third example embodiment. For example, rule 1 indicates that if a failure applicable to the rule occurs between 6:30 and 8:10 daily, the execution of an action command will be suppressed. Rule 1 also indicates that if a failure applicable to the rule occurs during a time period of 30 minutes from 6:00 or between 8:10 and 18:00, and the power supply is turned off and on once, the power supply can only be turned off and on again up to a total of three times during the following three hours.

In rule 2, if the CPU usage rate exceeds 80% between 12:00 and 13:00, an action command to reboot the AP server is executed. However, rule 2 indicates that the reboot of the AP server is executed at intervals of 10 minutes even if the failure occurs frequently.

In rule 3, if the memory usage rate exceeds 90% between 6:00 and 18:00, an action command to send a warning mail is executed. However, rule 3 indicates that once an email is sent, the transmission of the mail is suppressed up to five times even if a similar failure occurs thereafter.

Figure 15:
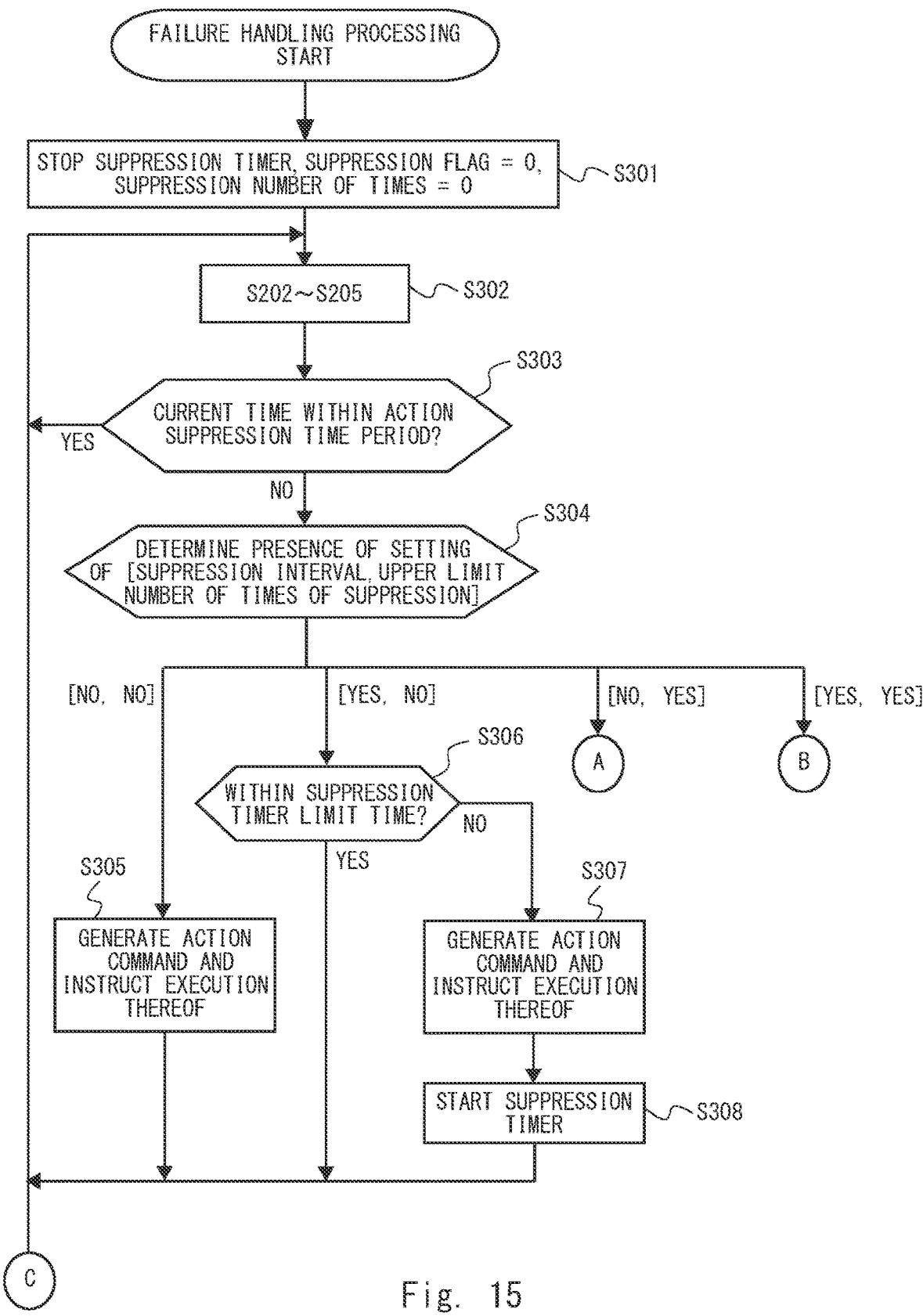
FIG. 15 is a flowchart illustrating the flow of failure handling processing according to the third example embodiment.
Figure 16:
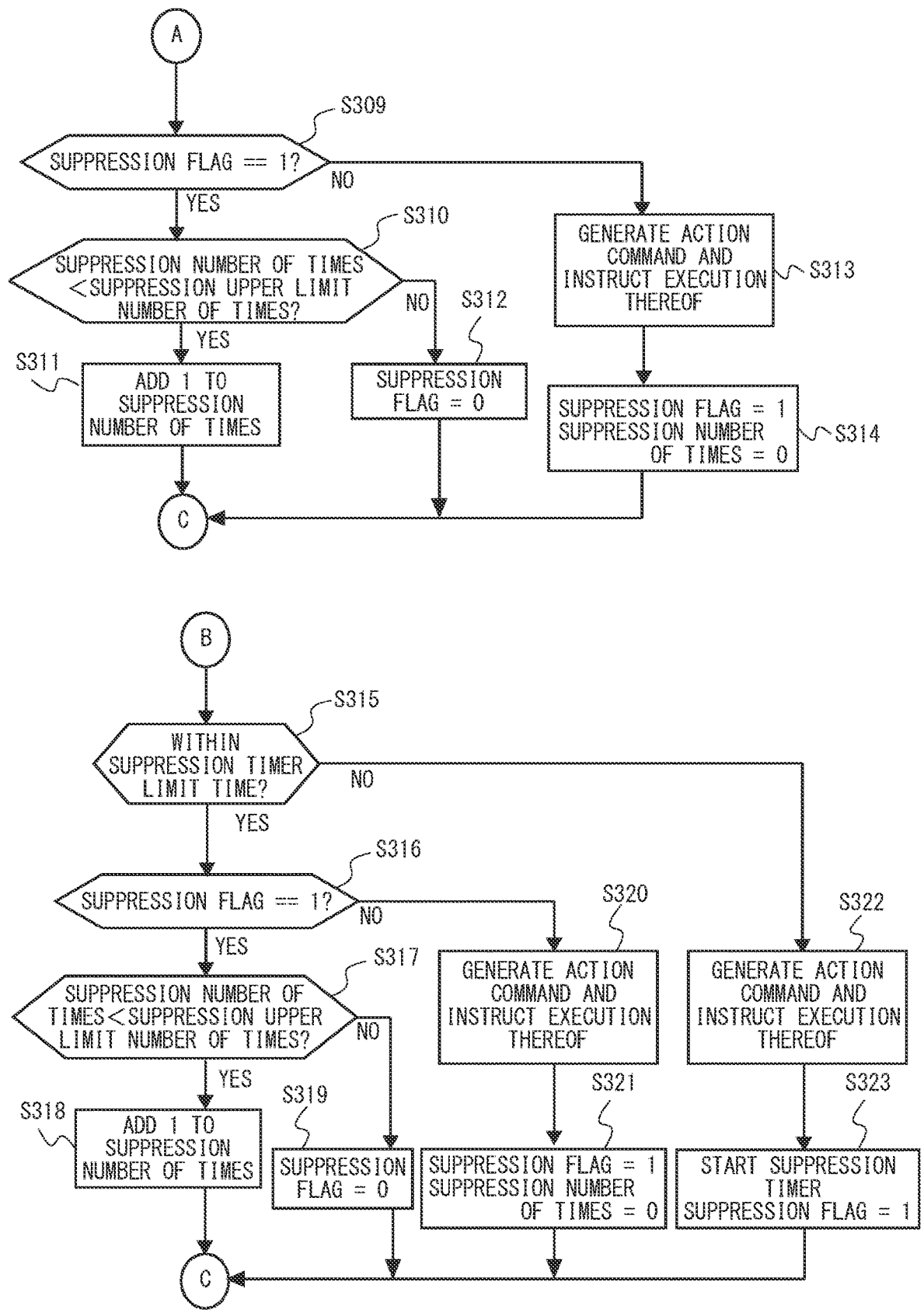
FIG. 16 is a flowchart illustrating the flow of the failure handling processing according to the third example embodiment.

FIGS. 15 and 16 are flowcharts illustrating the flows of the failure handling processing according to the third example embodiment. First, as an initial setting, the control unit 32 stops the suppression timer for each rule and sets "0" in the suppression flag and the number of times of suppression (S301). Next, the processing associated with steps S202 to S205 in FIG. 12 is executed (S302). In this way, the determination unit 323 identifies the rule for which the extracted information satisfies the execution condition.

Subsequently, the determination unit 323 determines whether the current time is included in the action suppression time period in the identified rule (S303). When the current time is included in the action suppression time period, the process returns to step S302. In other words, in this case, the execution of the action command in the identified rule is suppressed.

On the other hand, when the current time is not included in the action suppression time period, the process advances to step S304. Note that the process also advances to step S304 when no action suppression time period is set in the identified rule. Then, the determination unit 323 determines whether the combination of the action suppression interval and the action suppression upper limit number of times is set in the identified rule (S304).

When it is determined that neither the action suppression interval nor the action suppression upper limit number of times is set at step S304 (in the case of [No, No]), the action command generation unit 324 identifies an action section in the identified rule and generates an action command from the action section. Then, the execution instruction unit 325 outputs an action command execution instruction to the handling execution tool 4 (S305). Thereafter, the process returns to step S302.

When it is determined that the action suppression interval is set and the action suppression upper limit number of times is not set ([Yes, No]) at step S304, the determination unit 323 determines whether the suppression timer is within the time limit (S306). Alternatively, the determination unit 323 may determine whether the suppression timer is operating. If the suppression timer is within the time limit, the process returns to step S302. In other words, if the suppression timer is within the time limit, the execution of the action command in the identified rule is suppressed.

When the suppression timer is outside the time limit at step S306, that is, the suppression timer has stopped, the action command generation unit 324 identifies an action section in the identified rule and generates an action command from the action section. Then, the execution instruction unit 325 outputs an action command execution instruction to the handling execution tool 4 (S307). Then, the control unit 32 sets the action suppression interval associated with the identified rule as a time limit and starts the suppression timer (S308). Thereafter, the process returns to step S302. Note that it is assumed that the suppression timer automatically stops when the time limit has elapsed. In other words, the execution suppression is released when the action suppression interval has elapsed from the execution of the action.

When it is determined that the action suppression interval is not set and the action suppression upper limit number of times is set ([No, Yes]) at step S304, the determination unit 323 determines whether the suppression flag is 1 or not (S309). When the suppression flag is 1, the determination unit 323 determines whether the current number of times of suppression with regard to the identified rule is less than the action suppression upper limit number of times associated with the identified rule (S310). When the suppression number of times is smaller than the upper limit number of times, the control unit 32 adds 1 to the current number of times of suppression (S311). Thereafter, the process returns to step S302. On the other hand, when the number of times of suppression is not less than the upper limit number of times (that is, when the number of times of suppression is the upper limit number of times), the control unit 32 updates the suppression flag to "0" (S312). Thereafter, the process returns to step S302. That is, when the suppression flag is 1 (in both cases of steps S311 and S312), the execution of the action command with regard to the identified rule is suppressed.

When the suppression flag is 0 at step S309, the action command generation unit 324 identifies an action section in the identified rule and generates an action command from the action section. Then, the execution instruction unit 325 outputs an action command execution instruction to the handling execution tool 4 (S313). Then, the control unit 32 updates the suppression flag associated with the identified rule to "1" and updates (clears) the number of times of suppression to "0" (S314). Thereafter, the process returns to step S302.

When it is determined that both the action suppression interval and the action suppression upper limit number of times are set (in the case of [Yes, Yes]) at step S304, the determination unit 323 determines whether the suppression timer is within the time limit (S315). When the suppression timer is within the time limit, steps S316 to S321 are executed in a similar manner to steps S309 to S314 described above.

When the suppression timer is outside the time limit at step S315, that is, the suppression timer has stopped, the action command generation unit 324 identifies an action section in the identified rule and generates an action command from the action section. Then, the execution instruction unit 325 outputs an action command execution instruction to the handling execution tool 4 (S322). Then, the control unit 32 starts the suppression timer by setting the action suppression interval associated with the identified rule as the time limit and updates the suppression flag associated with the identified rule to "1" (S323). Thereafter, the process returns to step S302.

Next, an example of operation using a combination pattern of an action suppression interval and an upper limit number of times according to the third example embodiment will be explained. FIG. 17 is a diagram illustrating an example of the combination pattern of the action suppression interval and the upper limit number of times according to the third example embodiment. Pattern (1) is a case in which the action suppression interval is "No" and the action suppression upper limit number of times is "No;" the action is executed normally without the action execution being suppressed. Pattern (2) is a case in which the action suppression interval is "5 seconds" and the action suppression upper limit number of times is "No." In this case, execution of actions of the same rule is suppressed for 5 seconds after the action is executed. Pattern (3) is a case in which the action suppression interval is "No" and the action suppression upper limit number of times is "5 times." In this case, after the action is executed, execution of actions of the same rule is suppressed five times. Pattern (4) is a case in which the action suppression interval is "5 seconds" and the action suppression upper limit number of times is "5 times." In this case, suppression is executed as a combination of patterns (2) and (3). In the following, however, pattern (2) will be given priority.

Figure 18:
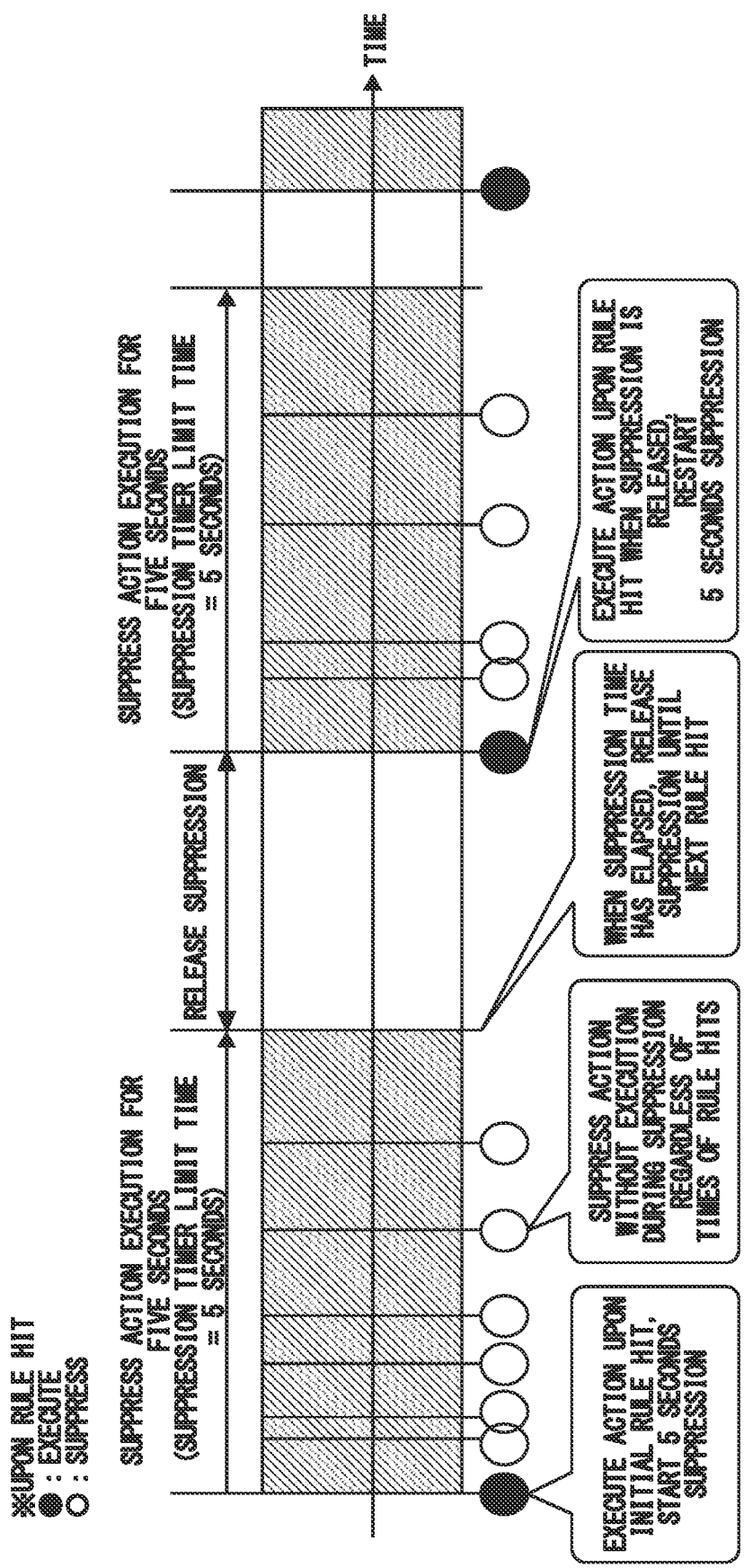
FIG. 18 is a diagram illustrating an example of a case in which the action suppression interval is set to Yes according to the third example embodiment.

FIG. 18 is a diagram illustrating an example of a case in which the action suppression interval is set to Yes (pattern (2)) according to the third example embodiment. In this case, first, the failure handling apparatus 3 executes the corresponding action upon the first rule hit. At the same time, the failure handling apparatus 3 starts suppression (timer) of 5 seconds. Then, the failure handling apparatus 3 suppresses the execution of the corresponding action for 5 seconds from the start of the suppression timer no matter how many times the same rule hits. Thereafter, when the suppression time has elapsed, the failure handling apparatus 3 releases the suppression until the next rule hits. Then, when a rule hits in a state where the suppression is released, the failure handling apparatus 3 executes the corresponding action, and at the same time, restarts suppression (timer) of 5 seconds.

Figure 19:
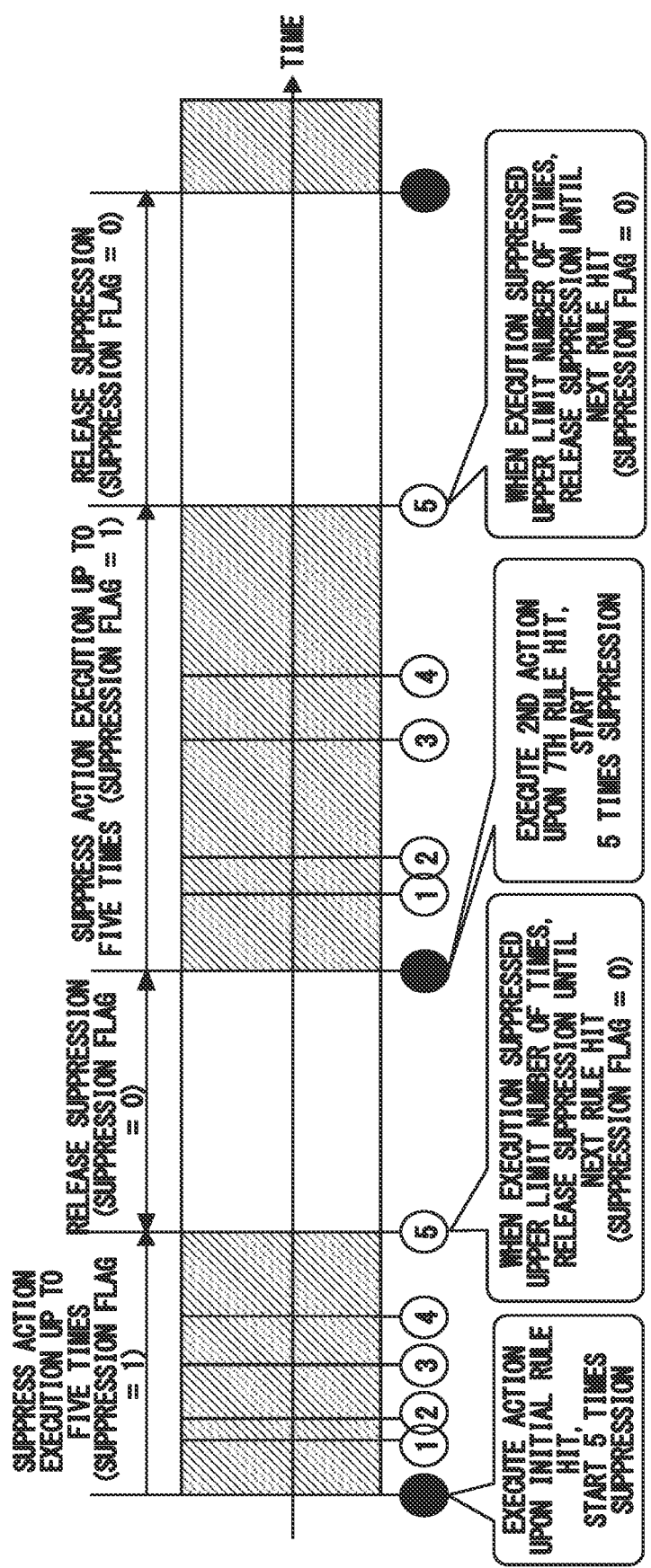
FIG. 19 is a diagram illustrating an example of a case in which the action suppression upper limit number of times is set to Yes according to the third example embodiment.

FIG. 19 is a diagram illustrating an example of a case in which the action suppression upper limit number of times s set to Yes (pattern 3) according to the third example embodiment. In this case, first, the failure handling apparatus 3 executes the corresponding action upon the first rule hit. At this time, the failure handling apparatus 3 starts suppression, that is, updates the suppression flag to 1. Thus, if the same rule subsequently hits, the execution of the corresponding action is suppressed up to 5 times. Then, in the case of the sixth time rule hit (the fifth time during the suppression period), the failure handling apparatus 3 releases the suppression, that is, updates the suppression flag to 0. Then, upon the seventh rule hit (in total), the failure handling apparatus 3 executes the corresponding action and restarts suppression, that is, updates the suppression flag to 1. In other words, the suppression interval is not limited.

Figure 20:
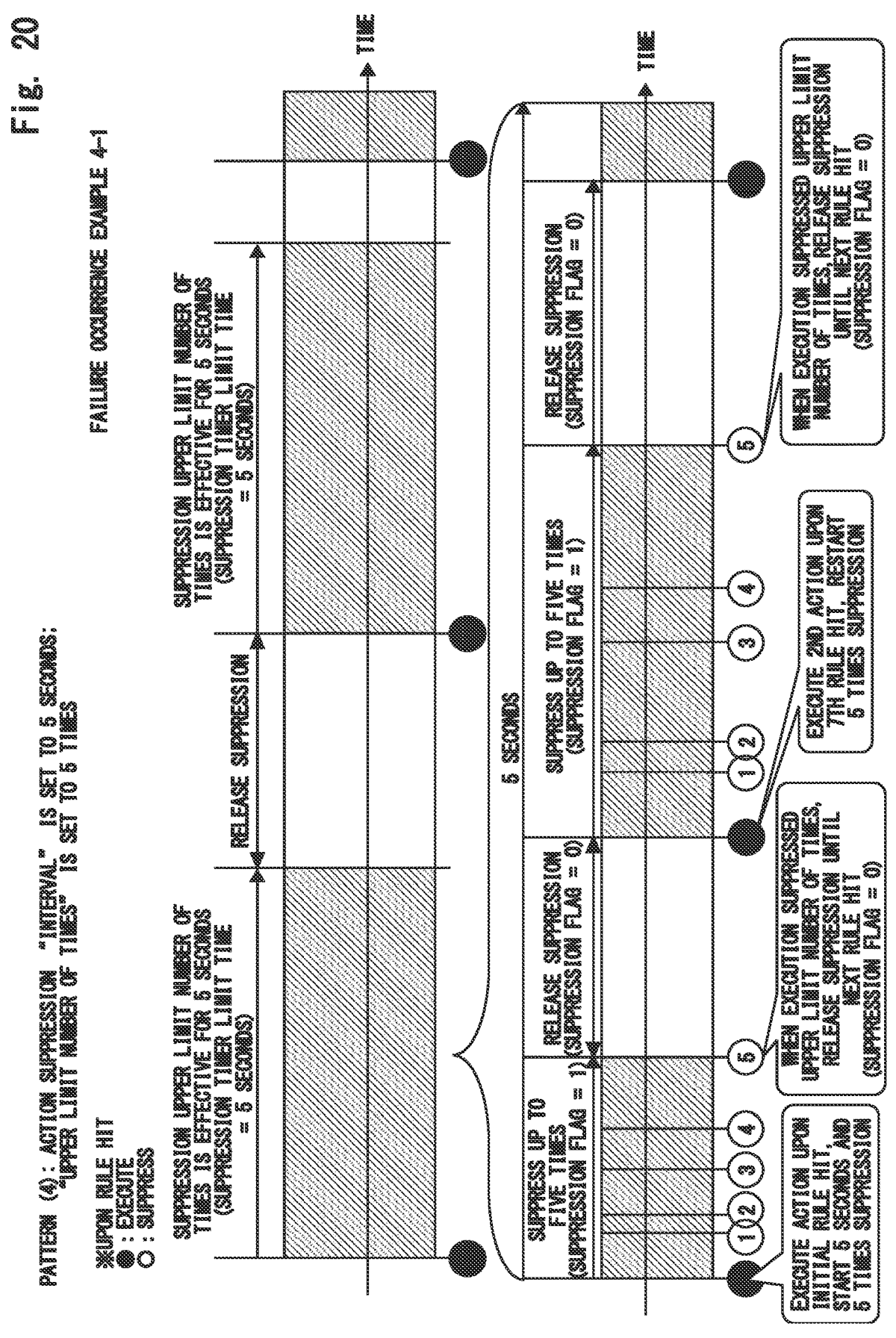

FIG. 20 is a diagram illustrating an example of a case in which the action suppression interval and the upper limit number of times are set to Yes (pattern 4) according to the third example embodiment (failure occurrence example 4-1). Here, since pattern (2) (action suppression interval) is prioritized, the suppression is released when 5 seconds have elapsed from the action execution by the first rule hit. Then, the suppression flag is repeatedly updated to "1" and "0" with an interval of 5 seconds after the action suppression starts. FIG. 20 illustrates that 13 rule hits occur within 5 seconds, but the corresponding action is executed only on the 1st, 7th, and 13th rule hits.

Figure 21:
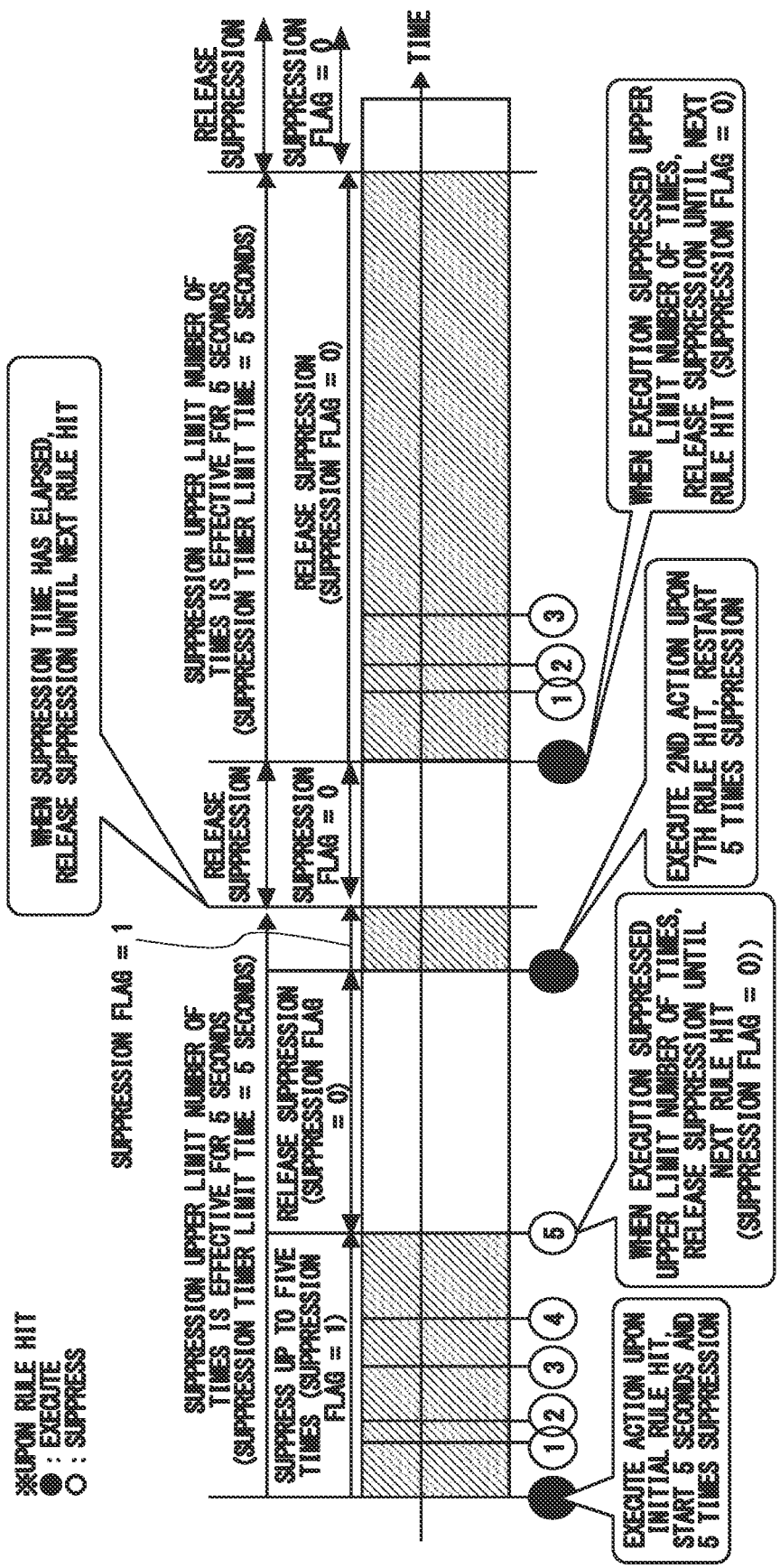
FIG. 21 is a diagram illustrating another example of a case in which the action suppression interval and the upper limit number of times are set to Yes according to the third embodiment.

FIG. 21 is a diagram illustrating a case in which the action suppression interval and the upper limit number of times are set to Yes (another example of pattern (4) according to the third example embodiment (failure occurrence example 4-2)). FIG. 21 illustrates that 7 rule hits occur (including the first one) within 5 seconds from the execution of the action by the first rule hit, and the corresponding action is executed only on the 1st and 7th rule hits. Then, regardless of the elapsed time from the 7th rule hit, the corresponding action is executed by the 8th rule hit; at the same time, the suppression timer is restarted and the suppression flag is updated to 1.

In this way, the present example embodiment allows flexible control of the execution of handling as described above by using execution suppression conditions.

Note that the action control section may also include a re-execution condition. The re-execution condition may include an action retry interval and an action retry number of times. The action retry interval is the waiting time to wait for a response of the execution result when the corresponding action is executed. The action retry number of times is the upper limit number of times to re-execute the corresponding action after the waiting time has elapsed.

Other Example Embodiment

Although the present invention has been described as a hardware configuration in the above example embodiment, the present invention is not limited thereto. The present disclosure can also be realized by causing a CPU to execute a computer program for any processing.

In the above-described examples, the program can be stored using any of various types of non-transitory computer-readable media and can be supplied to a computer. The non-transitory computer-readable media include various types of tangible storage media. Examples of the non-transitory computer-readable media include magnetic storage media (for example, flexible disks, magnetic tapes, and hard disk drives), magneto-optical storage media (for example, magneto-optical disks), cd-read-only memory (ROM), CD-R, CD-R/W, digital versatile disc (DVD), semiconductor memory (for example, mask ROM, programmable rom (PROM), erasable prom (EPROM)), flash ROM, and random access memory (RAM). The program may also be supplied to a computer through any of various types of transitory computer-readable media. Examples of the transitory computer-readable media include electrical signals, optical signals, and electromagnetic waves. The transitory computer-readable media can supply the program to a computer via a wired communication path, such as an electric wire and an optical fiber, or a wireless communication path.

Note that the present invention is not limited to the above-described embodiments, and may be changed as appropriate without departing from the purpose. The present disclosure may also be implemented by appropriately combining the embodiments.

Some or all of the above example embodiments may also be described as in the following Supplementary Notes, but are not limited to the following.

(Supplementary note A1)

A failure handling apparatus comprising:
  storage means for storing a list of a plurality of failure handling rules in which a handling content relevant to a failure message detected from an information system is associated with an execution condition for executing the handling content against the information system;
  acquisition means for acquiring the failure message;
  determination means for determining whether extracted information being extracted from the acquired failure message is applicable to the execution condition for each of the plurality of failure handling rules in the list; and
  execution control means for identifying a handling content associated with the execution condition that is determined to be applicable, and executing the identified handling content against the information system, the failure handling apparatus further comprising:

acceptance means for accepting specification of condition information in the execution condition;

code generation means for generating a program code of a conditional expression based on the specified condition information;

template generation means for generating an input template of the plurality of failure handling rules, including an input field of a determination criterion value for determining the extracted information, based on the program code, and an input field of the handling content; and list generation means for setting input values, for the input template, to the input fields, and storing the input values in the storage means as the list.

(Supplementary note A2)

The failure handling apparatus according to Supplementary note A1, wherein, when the list generation means receives an input of an execution suppression condition for a specific failure handling rule, the list generation means updates the list by further associating the execution suppression condition with the execution condition of the specific failure handling rule, when the execution condition that is determined to be applicable is associated with the execution suppression condition, the determination means determines whether the execution suppression condition is satisfied, and, when the execution suppression condition is satisfied, the execution control means suppresses execution of the specified handling content.

(Supplementary note A3)

The failure handling apparatus according to Supplementary note A2, wherein the execution suppression condition includes an upper limit number of times per unit time for executing the handling content to which the execution suppression condition is associated, and, when the determination means determines that the number of times per unit time for executing the handling content exceeds the upper limit number of times, the determination means determines that the execution suppression condition is satisfied.

(Supplementary note A4)

The failure handling apparatus according to Supplementary note A2 or A3, wherein the execution suppression condition includes an interval for suppressing execution of the handling content to which the execution suppression condition is associated, and, when the determination means determines that the interval has not elapsed since last execution of the handling content, the determination means determines that the execution suppression condition is satisfied.

(Supplementary note A5)

The failure handling apparatus according to any one of Supplementary notes A2 to A4, wherein the execution suppression condition includes a time period for suppressing execution of the handling content to which the execution suppression condition is associated, and, when the determination means determines that current time is included in the time period, the determination means determines that the execution suppression condition is satisfied.

(Supplementary note A6)

The failure handling apparatus according to any one of Supplementary notes A1 to A5, wherein the storage means stores the list for each service type, and the determination means determines a service type from the extracted information, identifies the list associated to the determined service type, and determines whether extracted information being extracted from the acquired failure message is applicable to the execution condition for each of the plurality of failure handling rules in the identified list.

(Supplementary note B1)

A failure handling system comprising:

detection means for detecting a failure message from an information system;

storage means for storing a list of a plurality of failure handling rules in which a handling content relevant to the detected failure message is associated with an execution condition for executing the handling content against the information system;

acquisition means for acquiring the failure message;

determination means for determining whether extracted information being extracted from the acquired failure message is applicable to the execution condition for each of the plurality of failure handling rules in the list;

execution control means for identifying a handling content associated with the execution condition that is determined to be applicable and instructing to execute the identified handling content against the information system; and execution means for executing the identified handling content against the information system in accordance with the instruction, the failure handling system further comprising:

acceptance means for accepting specification of condition information in the execution condition;

code generation means for generating a program code of a conditional expression based on the specified condition information;

template generation means for generating an input template of the plurality of failure handling rules, including an input field of a determination criterion value for determining the extracted information, based on the program code, and an input field of the handling content; and list generation means for setting input values, for the input template, in the input fields and storing the input values in the storage means as the list.

(Supplementary note B2)

The failure handling system according to Supplementary note B2, wherein, when the list generation means receives an input of an execution suppression condition for a specific failure handling rule, the list generation means updates the list by further associating the execution suppression condition to the execution condition of the specific failure handling rule, when the execution condition that is determined to be applicable is associated with the execution suppression condition, the determination means determines whether the execution suppression condition is satisfied, and, when the execution suppression condition is satisfied, the execution control means suppresses execution of the specified handling content.

(Supplementary note C1)

A rule list generation method by a failure handling apparatus including:

storage means for storing a list of a plurality of failure handling rules in which a handling content relevant to a failure message detected from an information system is associated with an execution condition for executing the handling content against the information system;

acquisition means for acquiring the failure message;

determination means for determining whether extracted information being extracted from the acquired failure message is applicable to the execution condition for each of the plurality of failure handling rules in the list; and execution control means for identifying a handling content associated with the execution condition that is determined to be applicable and executing the identified handling content against the information system, the rule list generation method comprising:

accepting specification of condition information in the execution condition;

generating a program code of a conditional expression based on the specified condition information;

generating an input template of the plurality of failure handling rules, including an input field of a determination criterion value for determining the extracted information, based on the program code, and an input field of the handling content; and setting input values, for the input template, in the input fields and storing the input values in the storage means as the list.

(Supplementary note D1)

A non-transitory computer-readable medium that stores a program causing a computer to perform:

processing of accepting specification of condition information in an execution condition for executing a handling content associated with a failure message detected from an information system against the information system;

processing of generating a program code of a conditional expression based on the specified condition information;

processing of generating an input template of the plurality of failure handling rules, including an input field of a determination criterion value for determining extracted information extracted from the failure message, based on the program code, and an input field of the handling content;

processing of setting input values, for the input template, in the input fields and storing the input values in a storage apparatus as a list of the plurality of failure handling rules;

processing of acquiring the failure message;

processing of determining whether extracted information being extracted from the acquired failure message is applicable to the execution condition for each of the plurality of failure handling rules in the list; and processing of identifying a handling content associated with the execution condition that is determined to be applicable and executing the identified handling content against the information system.

As described above, the present invention has been described with reference to embodiments (and examples), but the present invention is not limited to the above-described embodiments (and examples). The configuration and details of the present invention can be modified in various ways that may be understood by those skilled in the art within the scope of the present invention.

This application claims priority based on Japanese Patent Application No. 2020-032721, filed on Feb. 28, 2020, the entire disclosure of which is incorporated herein by reference.

REFERENCE SIGNS LIST

100 Failure Handling Apparatus
11 Storage Unit
110 List
111 Failure Handling Rule
1111 Handling Content
1112 Execution Condition
11$m$ Failure Handling Rule
12 Acquisition Unit
13 Determination Unit
14 Execution Control Unit
15 Acceptance Unit
16 Code Generation Unit
17 Template Generation Unit
18 List Generation Unit
1000 Failure Handling System
1 Information System
2 Monitoring Tool
3 Failure Handling Apparatus
31 Storage Unit
310 Program
311 Rule List
3110 Service Type
40 Header Section
401 Header Code Section
402 Condition Code Section
403 Condition Header Section
404 Action Code Section
405 Action Header Section
41 Rule
411 Condition Section
412 Action Section
4$m$ Rule
31$n$ Rule List
32 Control Unit
321 Rule List Generation Unit
322 Message Analysis Unit
323 Determination Unit
324 Action Command Generation Unit
325 Execution Instruction Unit
33 Memory
34 Communication Unit
4 Handling Execution Tool
5 Mail Server
6 Operation Terminal
50 Condition Section Definition Screen
51 Move Section
52 Condition Name
521 Condition Name Input Field
53 Conditional Expression
531 Conditional Expression Selection Field
54 Delete
55 Add Conditional Expression Button
56 Close Button
57 Add Button

What is claimed is:

1. A failure handling apparatus comprising:
at least one memory configured to store instructions and a list of a plurality of failure handling rules in which a handling content relevant to a failure message detected from an information system is associated with an execution condition for executing the handling content against the information system, and at least one processor configured to execute the instructions to:

acquire the failure message;

determine whether extracted information being extracted from the acquired failure message is applicable to the execution condition for each of the plurality of failure handling rules in the list; and identify a handling content associated with the execution condition that is determined to be applicable, and execute the identified handling content against the information system, accept specification of condition information in the execution condition;

generate a program code of a conditional expression based on the specified condition information;

generate an input template of the plurality of failure handling rules, including an input field of a determination criterion value for determining the extracted information, based on the program code, and an input field of the handling content; and set input values, for the input template, to the input fields, and storing the input values in the memory as the list.

2. The failure handling apparatus according to claim 1, wherein, the at least one processor is further configured to execute the instructions to:

when an input of an execution suppression condition for a specific failure handling rule is received, update the list by further associating the execution suppression condition with the execution condition of the specific failure handling rule, when the execution condition that is determined to be applicable is associated with the execution suppression condition, determine whether the execution suppression condition is satisfied, and, when the execution suppression condition is satisfied, suppress execution of the specified handling content.

3. The failure handling apparatus according to claim 2, wherein the execution suppression condition includes an upper limit number of times per unit time for executing the handling content to which the execution suppression condition is associated, and, wherein the at least one processor is further configured to execute the instructions to:

when the number of times per unit time for executing the handling content exceeds the upper limit number of times is determined, determine that the execution suppression condition is satisfied.

4. The failure handling apparatus according to claim 2 or 3, wherein the execution suppression condition includes an interval for suppressing execution of the handling content to which the execution suppression condition is associated, and, wherein the at least one processor is further configured to execute the instructions to:

when the interval has not elapsed since last execution of the handling content is determined, determine that the execution suppression condition is satisfied.

5. The failure handling apparatus according to claim 2, wherein the execution suppression condition includes a time period for suppressing execution of the handling content to which the execution suppression condition is associated, and, wherein the at least one processor is further configured to execute the instructions to:

when current time is included in the time period is determined, determine that the execution suppression condition is satisfied.

6. The failure handling apparatus according to claim 1, wherein the at least one memory is further configured to store the list for each service type, and wherein the at least one processor is further configured to execute the instructions to:

determine a service type from the extracted information, identify the list associated to the determined service type, and determine whether extracted information being extracted from the acquired failure message is applicable to the execution condition for each of the plurality of failure handling rules in the identified list.

7. A rule list generation method by a failure handling apparatus including:

at least one memory configured to store instructions and a list of a plurality of failure handling rules in which a handling content relevant to a failure message detected from an information system is associated with an execution condition for executing the handling content against the information system, and at least one processor configured to execute the instructions to:

store a list of a plurality of failure handling rules in which a handling content relevant to a failure message detected from an information system is associated with an execution condition for executing the handling content against the information system;

acquire the failure message;

determining whether extracted information being extracted from the acquired failure message is applicable to the execution condition for each of the plurality of failure handling rules in the list; and identify a handling content associated with the execution condition that is determined to be applicable and executing the identified handling content against the information system, the rule list generation method comprising:

accepting specification of condition information in the execution condition;

generating a program code of a conditional expression based on the specified condition information;

generating an input template of the plurality of failure handling rules, including an input field of a determination criterion value for determining the extracted information, based on the program code, and an input field of the handling content; and setting input values, for the input template, in the input fields and storing the input values in the memory as the list.

8. A non-transitory computer-readable medium that stores a program causing a computer to perform:

processing of accepting specification of condition information in an execution condition for executing a handling content associated with a failure message detected from an information system against the information system;

processing of generating a program code of a conditional expression based on the specified condition information;

processing of generating an input template of a plurality of failure handling rules, including an input field of a determination criterion value for determining extracted information extracted from the failure message, based on the program code, and an input field of the handling content;

processing of setting input values, for the input template, in the input fields and storing the input values in a storage apparatus as a list of the plurality of failure handling rules;

processing of acquiring the failure message;

processing of determining whether extracted information being extracted from the acquired failure message is applicable to the execution condition for each of the plurality of failure handling rules in the list; and processing of identifying a handling content associated with the execution condition that is determined to be applicable and executing the identified handling content against the information system.

* * * * *